US012634508B2

(12) United States Patent
Zhang et al.

(10) Patent No.: US 12,634,508 B2
(45) Date of Patent: May 19, 2026

(54) PRIORITY-BASED NON-ADJACENT MERGE DESIGN

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 47 days.

(21) Appl. No.: 18/174,149

(22) Filed: Feb. 24, 2023

(65) Prior Publication Data

US 2023/0217039 A1 Jul. 6, 2023

Related U.S. Application Data

(63) Continuation of application No. 17/139,200, filed on Dec. 31, 2020, now Pat. No. 11,595,683, which is a
(Continued)

(30) Foreign Application Priority Data

Jul. 1, 2018 (WO) ................ PCT/CN2018/093944

(51) Int. Cl.
*H04N 19/52* (2014.01)
*H04N 19/176* (2014.01)

(52) U.S. Cl.
CPC ........... *H04N 19/52* (2014.11); *H04N 19/176* (2014.11)

(58) Field of Classification Search
CPC .... H04N 19/176; H04N 19/513; H04N 19/11; H04N 19/52; H04N 19/157; H04N 19/44;
(Continued)

(56) References Cited

U.S. PATENT DOCUMENTS

| | | | | |
|---|---|---|---|---|
| 6,360,017 B1 * | 3/2002 | Chiu | ...................... | H04N 19/51 |
| | | | | 375/E7.224 |
| 6,366,705 B1 * | 4/2002 | Chiu | .................... | H04N 19/176 |
| | | | | 375/E7.176 |

(Continued)

FOREIGN PATENT DOCUMENTS

| | | |
|---|---|---|
| CN | 101248673 A | 8/2008 |
| CN | 103460695 A | 12/2013 |

(Continued)

OTHER PUBLICATIONS

Sullivan et al. "Overview of the High Efficiency Video Coding (HEVC) Standard," IEEE Transactions on Circuits and Systems for Video Technology, Dec. 2012, 22(12):1649-1668.
(Continued)

*Primary Examiner* — Daniel Chang
(74) *Attorney, Agent, or Firm* — Conley Rose, P.C.

(57) ABSTRACT

Devices, systems and methods for constructing low-complexity non-adjacent merge candidates. In a representative aspect, a method for video processing includes receiving a current block of video data, selecting, based on a rule, a first non-adjacent block that is not adjacent to the current block, constructing a first merge candidate comprising motion information based on the first non-adjacent block, identifying a second non-adjacent block that is not adjacent to the current block and different from the first non-adjacent block, based on determining that the second non-adjacent block fails to satisfy the rule, refraining adding a second merge candidate derived from the second non-adjacent block, constructing a merge candidate list based on the first non-
(Continued)

Restricted Region for Non-Adjacent Blocks adjacent block, and decoding the current block based on the merge candidate list.

19 Claims, 31 Drawing Sheets

Related U.S. Application Data continuation of application No. PCT/IB2019/055573, filed on Jul. 1, 2019.

(58) Field of Classification Search
CPC .... H04N 19/107; H04N 19/51; H04N 19/503; H04N 19/109
See application file for complete search history.

(56) References Cited

U.S. PATENT DOCUMENTS

| | | | | |
|---|---|---|---|---|
| 10,362,330 | B1 * | 7/2019 | Li | H04N 19/44 |
| 10,440,378 | B1 * | 10/2019 | Xu | H04N 19/105 |
| 10,491,902 | B1 * | 11/2019 | Xu | H04N 19/573 |
| 12,382,105 | B2 * | 8/2025 | Liu | H04N 19/82 |
| 2002/0168007 | A1 * | 11/2002 | Lee | H04N 19/176 |
| | | | | 375/E7.176 |
| 2004/0114817 | A1 * | 6/2004 | Jayant | H04N 19/14 |
| | | | | 375/E7.176 |
| 2008/0267292 | A1 | 10/2008 | Ito | |
| 2009/0022223 | A1 | 1/2009 | Gallant | |
| 2013/0170550 | A1 | 7/2013 | Li | |
| 2014/0211857 | A1 | 7/2014 | Sugio | |
| 2015/0124886 | A1 | 5/2015 | Kim | |
| 2016/0337662 | A1 | 11/2016 | Pang | |
| 2017/0034526 | A1 * | 2/2017 | Rapaka | H04N 19/127 |
| 2017/0034529 | A1 * | 2/2017 | Lin | H04N 19/70 |
| 2017/0223379 | A1 * | 8/2017 | Chuang | H04N 19/513 |
| 2017/0280159 | A1 * | 9/2017 | Xu | H04N 19/593 |
| 2018/0041769 | A1 * | 2/2018 | Chuang | H04N 19/176 |
| 2018/0070100 | A1 * | 3/2018 | Chen | H04N 19/597 |
| 2018/0091816 | A1 * | 3/2018 | Chien | H04N 19/91 |
| 2018/0176596 | A1 * | 6/2018 | Jeong | H04N 19/82 |
| 2018/0192071 | A1 * | 7/2018 | Chuang | H04N 19/44 |
| 2018/0359483 | A1 * | 12/2018 | Chen | H04N 19/70 |
| 2019/0116376 | A1 * | 4/2019 | Chen | H04N 19/70 |
| 2019/0158870 | A1 * | 5/2019 | Xu | H04N 19/513 |
| 2019/0246118 | A1 * | 8/2019 | Ye | H04N 19/176 |
| 2019/0253705 | A1 * | 8/2019 | Zhao | H04N 19/593 |
| 2019/0373272 | A1 | 12/2019 | Ye | |
| 2020/0007889 | A1 * | 1/2020 | Chao | H04N 19/423 |
| 2020/0021845 | A1 * | 1/2020 | Lin | H04N 19/105 |
| 2020/0053379 | A1 * | 2/2020 | Han | H04N 19/52 |
| 2020/0128266 | A1 * | 4/2020 | Xu | H04N 19/119 |
| 2020/0169748 | A1 * | 5/2020 | Chen | H04N 19/521 |
| 2020/0221108 | A1 * | 7/2020 | Xu | H04N 19/70 |
| 2020/0228815 | A1 * | 7/2020 | Xu | H04N 19/52 |
| 2020/0244979 | A1 * | 7/2020 | Li | H04N 19/159 |
| 2020/0280733 | A1 * | 9/2020 | Li | H04N 19/436 |
| 2020/0280736 | A1 * | 9/2020 | Wang | H04N 19/513 |
| 2020/0288157 | A1 * | 9/2020 | Li | H04N 19/132 |
| 2020/0296411 | A1 * | 9/2020 | Li | H04N 19/176 |
| 2020/0304805 | A1 * | 9/2020 | Li | H04N 19/46 |
| 2020/0404253 | A1 * | 12/2020 | Chen | B23P 15/00 |
| 2020/0404305 | A1 * | 12/2020 | Ye | H04N 19/70 |
| 2020/0404306 | A1 * | 12/2020 | Auyeung | H04N 19/105 |
| 2021/0006788 | A1 * | 1/2021 | Zhang | H04N 19/139 |
| 2021/0021856 | A1 * | 1/2021 | Zheng | H04N 19/137 |
| 2021/0092357 | A1 * | 3/2021 | Wang | H04N 19/513 |
| 2021/0105482 | A1 * | 4/2021 | Zhang | H04N 19/30 |
| 2021/0168368 | A1 * | 6/2021 | Xu | H04N 19/50 |
| 2021/0243476 | A1 * | 8/2021 | Ko | H04N 19/52 |
| 2021/0329292 | A1 * | 10/2021 | Jeong | H04N 19/52 |
| 2021/0360277 | A1 * | 11/2021 | Jeong | H04N 19/513 |
| 2021/0368180 | A1 * | 11/2021 | Park | H04N 19/176 |
| 2021/0377558 | A1 * | 12/2021 | Xiu | H04N 19/513 |
| 2022/0021900 | A1 * | 1/2022 | Jeong | H04N 19/523 |

FOREIGN PATENT DOCUMENTS

| | | |
|---|---|---|
| CN | 104038761 A | 9/2014 |
| CN | 104394409 A | 3/2015 |
| CN | 104838656 A | 8/2015 |
| CN | 105075267 A | 11/2015 |
| CN | 105187839 A | 12/2015 |
| CN | 106713930 A | 5/2017 |
| CN | 107071438 A | 8/2017 |
| CN | 107801041 A | 3/2018 |
| CN | 108141589 A | 6/2018 |
| JP | 2015512216 A | 4/2015 |
| WO | 2018231700 A1 | 12/2018 |

OTHER PUBLICATIONS

Luthra et al. Overview of the H.264/AVC Video Coding Standard, Proc. SPIE, 5203, Applications of Digital Image Processing, Nov. 19, 2003, Optical Science and Technology, SPIE 48th annual Meeting, San Diego, CA, US, 2003.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

JEM-7.0: https://jvet.hhi.fraunhofer.de/svn/svn_HMJEMSoftware/tags/ HM-16.6-JEM-7.0, Mar. 18, 2021.

Retrieved from the internet, https://www.itu.int/rec/T-REC-H.265, H.265/HEVC, Mar. 18, 2021.

Bordes et al. "Description of SOR, HOR, and 360 degree Video Coding Technology Proposal by Qualcomm and Technicolor—Medium Complexity Version," Joint Video Experts Team (JVET) of ITU-T SG 16 WP 3 and ISO/IEC JTC/SC 29/WG 11, 10th Meeting, San Diego, US, Apr. 10-20, 2018, documentJVET-J0022, 2018.

Yang et al. "Description of CE4: Interprediction and Motion Vector Coding," Joint Video Experts Team (JVET) of ITU-T SG 16 WP 3 and and ISO/IEC JTC 1/SC 29/WG 11, 10th Meeting, San Diego, US, Apr. 10-20, 2018, document JVET-J1024, 2018.

Chen et al. "Description of SOR and HOR and 360 degree Video Coding Technology Proposal by Qualcomm and Technicolor—Low and High Complexity Versions," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0021 (v5), 2018.

Zhou et al. "Non-CE4: A Study on the Affine Merge Mode," Joint Video Experts team (JVET) of ITU-T SG 16 WP 3 and ISO/IEC JTC 1/SC 29/WG 11, 11th Meeting, Ljubljana, SI, Jul. 10-18, 2018, document JVET-K0052, 2018.

Yang et al. "Description of Core Experiment 4 (CE4): Inter Prediction and Motion Vector Coding," Joint Video Experts Team (JVET) of ITU-T SG 16 WP 3 and ISO/IEC JTC 1/SC 29/WG 11, 11th Meeting: Ljubljana, SI, Jul. 10-18, 2018, document JVET-K1024, 2018.

International Search Report and Written Opinion from International Patent Application No. PCT/IB2019/055563 dated Sep. 23, 2019 (17 pages).

International Search Report and Written Opinion from International Patent Application No. PCT/IB2019/055572 dated Oct. 7, 2019 (16 pages).

International Search Report and Written Opinion from International Patent Application No. PCT/IB2019/055573 dated Sep. 27, 2019 (17 pages).

Non-Final Office Action dated Apr. 1, 2022, 33 pages, U.S. Appl. No. 17/139,200, filed Dec. 31, 2020.

Notice of Allowance dated Oct. 26, 2022, 11 pages, U.S. Appl. No. 17/139,200, filed Dec. 31, 2020.

* cited by examiner

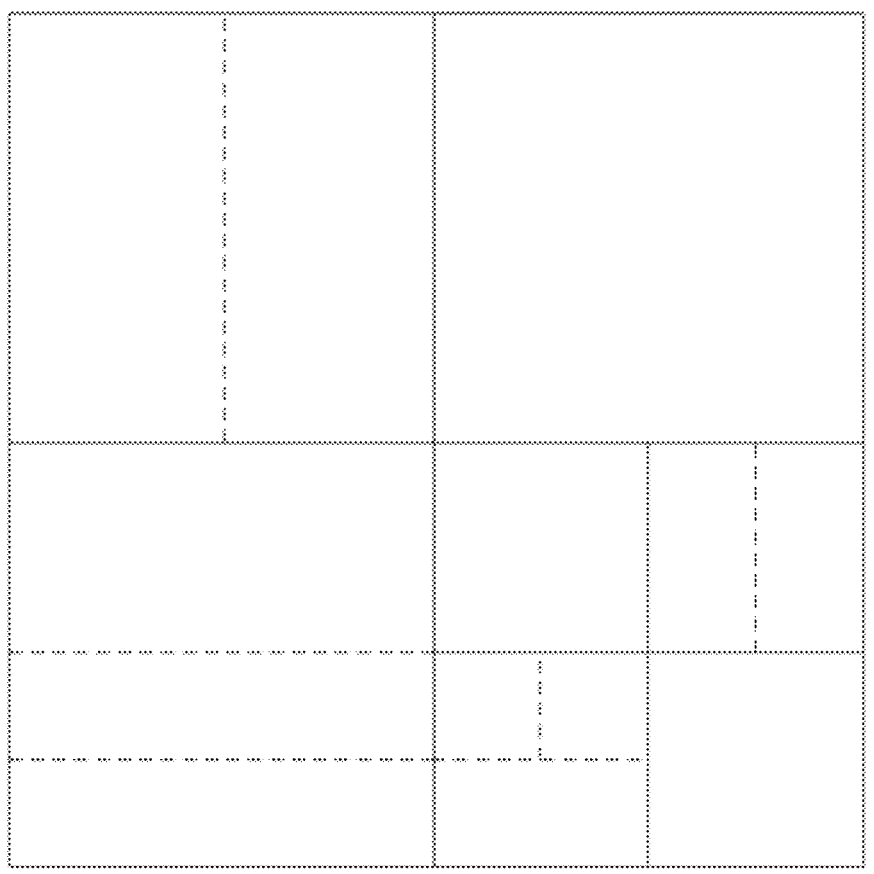
FIG. 7

Figure 15:
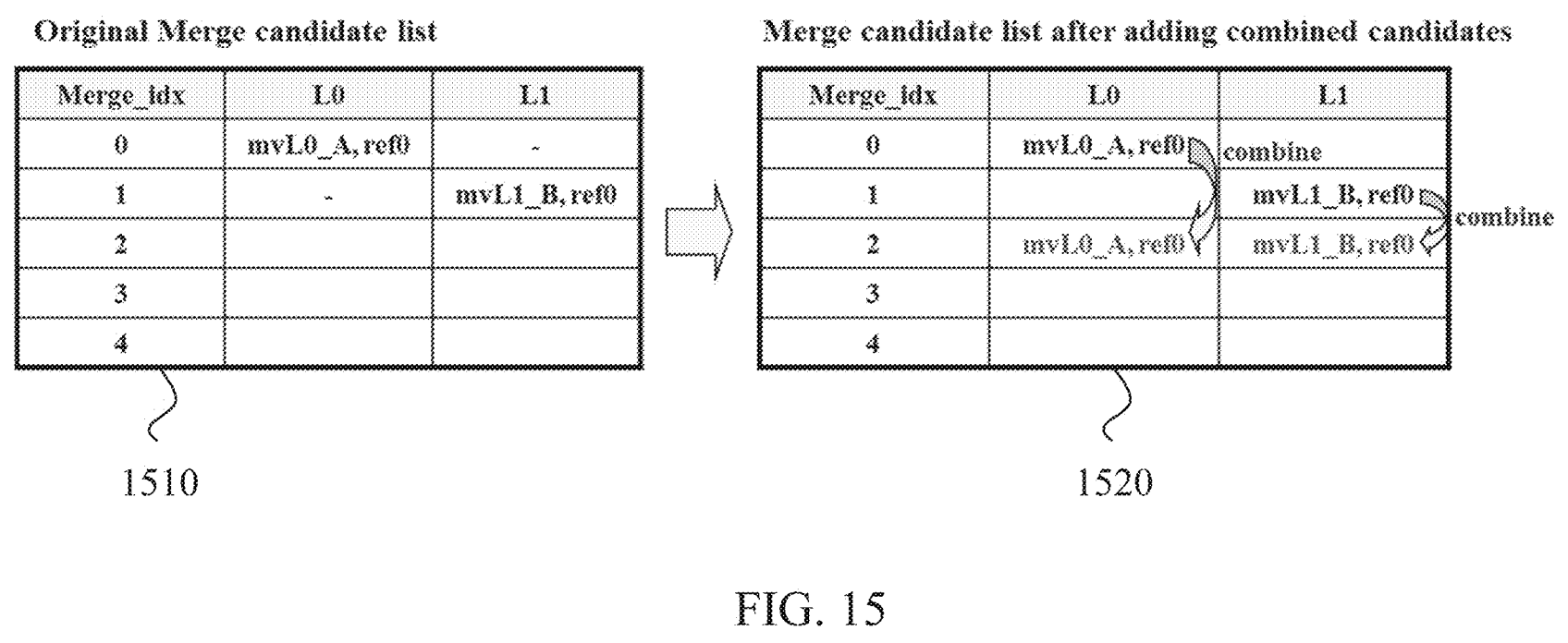

Merge candidate list after adding combined candidates

| Merge_Idx | L0 | L1 |
|---|---|---|
| 0 | mvL0_A,ref0 combine | mvL1_B,ref0 combine |
| 1 | | |
| 2 | mvL0_A,ref0 | mvL1_B,ref0 |
| 3 | | |
| 4 | | |

1520

Original Merge candidate list

| Merge_Idx | L0 | L1 |
|---|---|---|
| 0 | mvL0_A,ref0 | - |
| 1 | - | mvL1_B,ref0 |
| 2 | | |
| 3 | | |
| 4 | | |

```
//loop into adNeighbors
int offsetX = 0;
int offsetY = 0;
// loop all the allowed distances
for (int iDistanceIndex = 0; iDistanceIndex < NADISTANCE_LEVEL; iDistanceIndex++)
{
    // for a given distance, do the following:
    int iNADistance = NADISTANCE * (iDistanceIndex + 1);
    for (int NASPIdx = 0; NASPIdx < NACANDIDATE_NUM; NASPIdx++)
    {
        switch (NASPIdx)
        {
            case 0: offsetX = -iNADistance;                      offsetY = pu.Y().height >> 1; break;
            case 1: offsetX = pu.Y().width >> 1;                 offsetY = -iNADistance;         break;
            case 2: offsetX = -iNADistance;                      offsetY = 0;                           break;
            case 3: offsetX = 0;                                 offsetY = -iNADistance;          break;
            case 4: offsetX = -iNADistance;                      offsetY = pu.Y().height - 4;    break;
            case 5: offsetX = pu.Y().width - 4;                  offsetY = -iNADistance;          break;
            case 6: offsetX = -iNADistance;                      offsetY = -iNADistance;          break;
            case 7: offsetX = -iNADistance;                      offsetY = pu.Y().height + iNADistance - 4;    break;
            case 8: offsetX = pu.Y().width + iNADistance - 4;    offsetY = -iNADistance;          break;
            case 9: offsetX = -4;                                offsetY = pu.Y().height + iNADistance - 4;    break;
            case 10: offsetX = pu.Y().width + iNADistance - 4;   offsetY = -4;                    break;
        } get one non-adjacent block from position (current PU's left-top coordinate shifted by (offsetX, offsetY))
        check whether the non-adjacent block is inter coded block, if yes, go to the next step. Otherwise, go to the next
        loop to identify another non-adjacent block
        apply pruning to the motion information associated with the non-adjacent block to all previously added merge
        candidates. If it is not identical to any of previously added merge candidates, it is added to the merge candidate
        list. Otherwise, got to the next non-adjacent block.
    }
}
```

FIG. 26

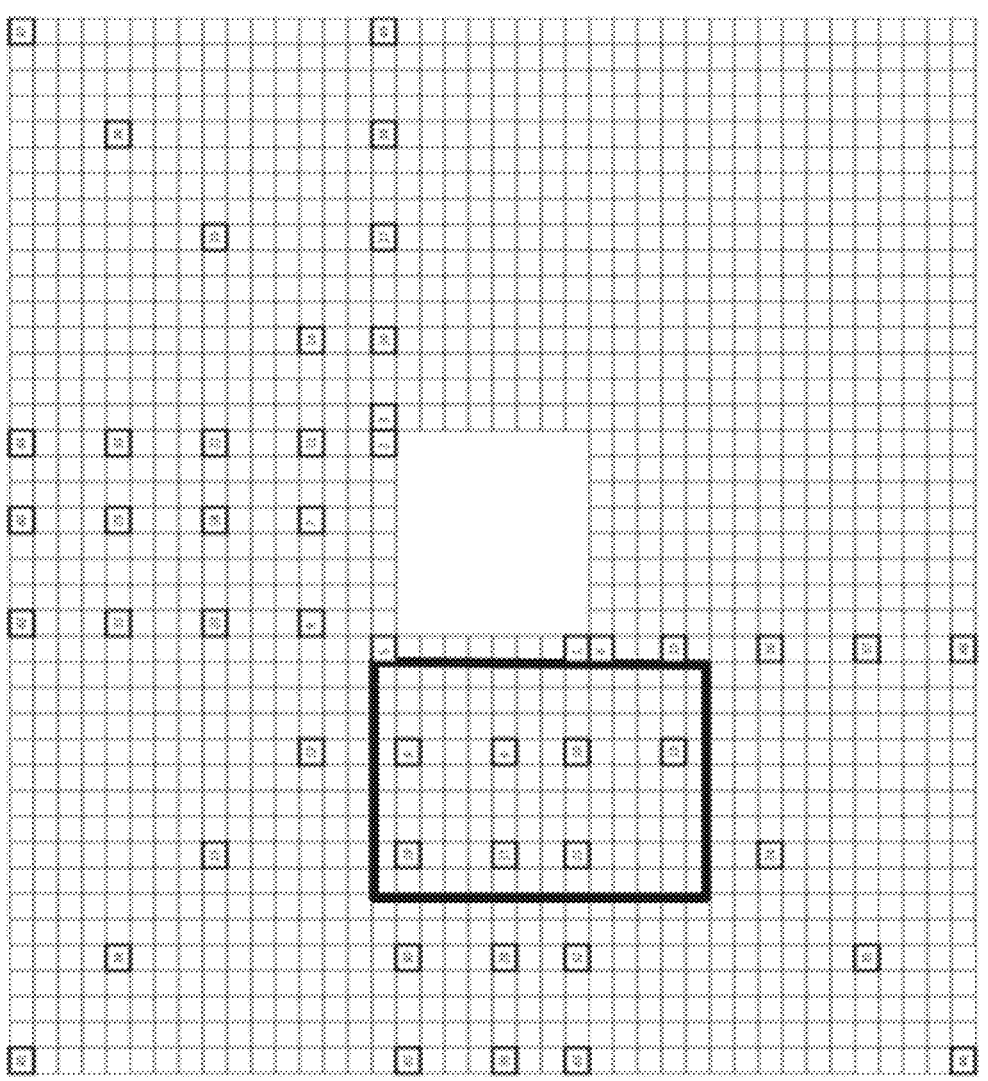
Restricted Region for Non-Adjacent Blocks
FIG. 27

2800

2810 — Receiving a current block of video data

2820 — Selecting, based on a rule, a first non-adjacent block that is not adjacent to the current block 2830 — Constructing a first merge candidate comprising motion information based on the first non-adjacent block 2840 — Identifying a second non-adjacent block that is not adjacent to the current block and different from the first non-adjacent block 2850 — Based on determining that the second non-adjacent block fails to satisfy the rule, refraining adding a second merge candidate derived from the second non-adjacent block 2860 — Constructing a merge candidate list based on the first non-adjacent block 2870 — Decoding the current block based on the merge candidate list

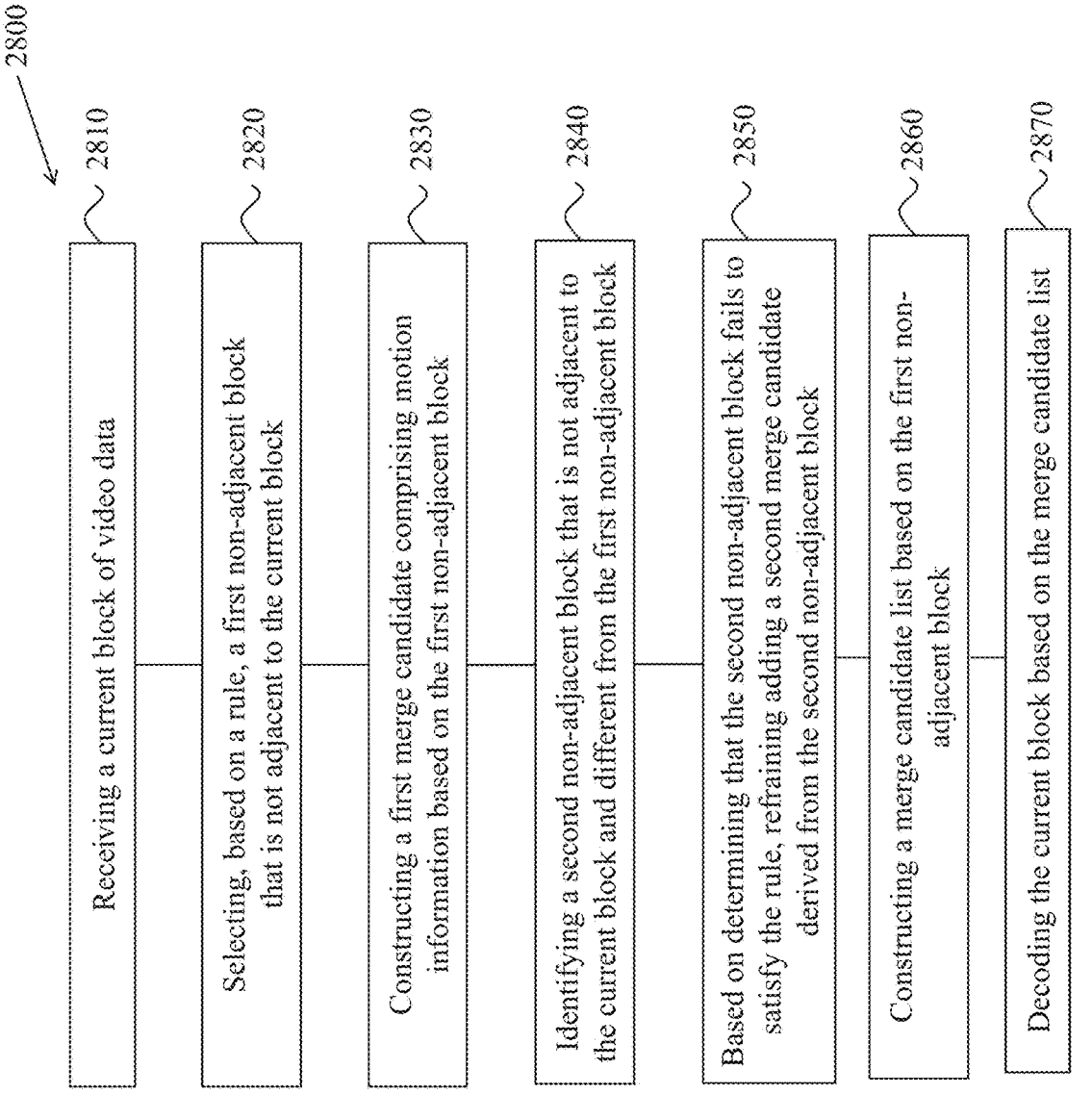

FIG. 28

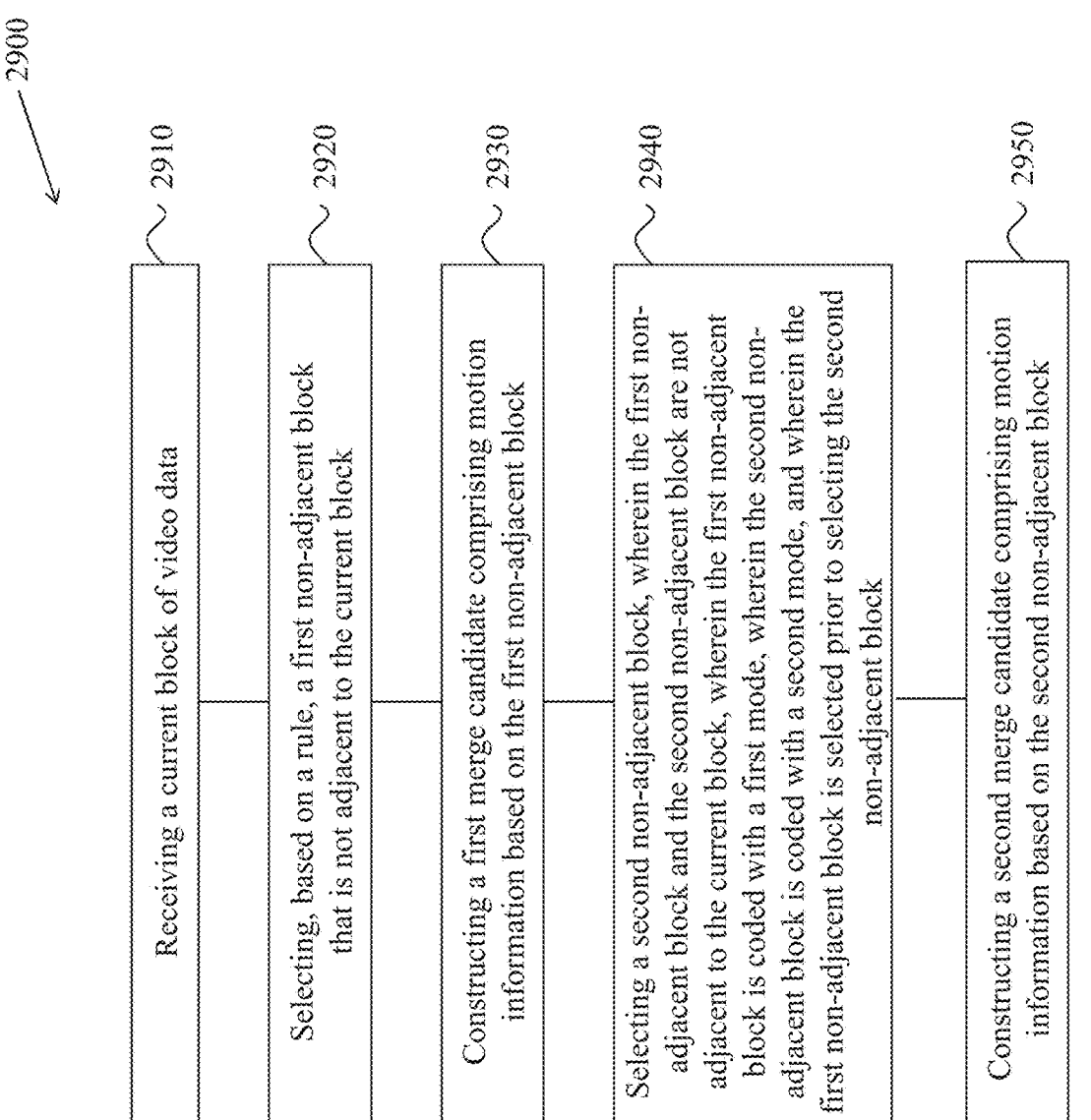

2900

2910 Receiving a current block of video data

2920 Selecting, based on a rule, a first non-adjacent block that is not adjacent to the current block 2930 Constructing a first merge candidate comprising motion information based on the first non-adjacent block 2940 Selecting a second non-adjacent block, wherein the first non-adjacent block and the second non-adjacent block are not adjacent to the current block, wherein the first non-adjacent block is coded with a first mode, wherein the second non-adjacent block is coded with a second mode, and wherein the first non-adjacent block is selected prior to selecting the second non-adjacent block 2950 Constructing a second merge candidate comprising motion information based on the second non-adjacent block

FIG. 29

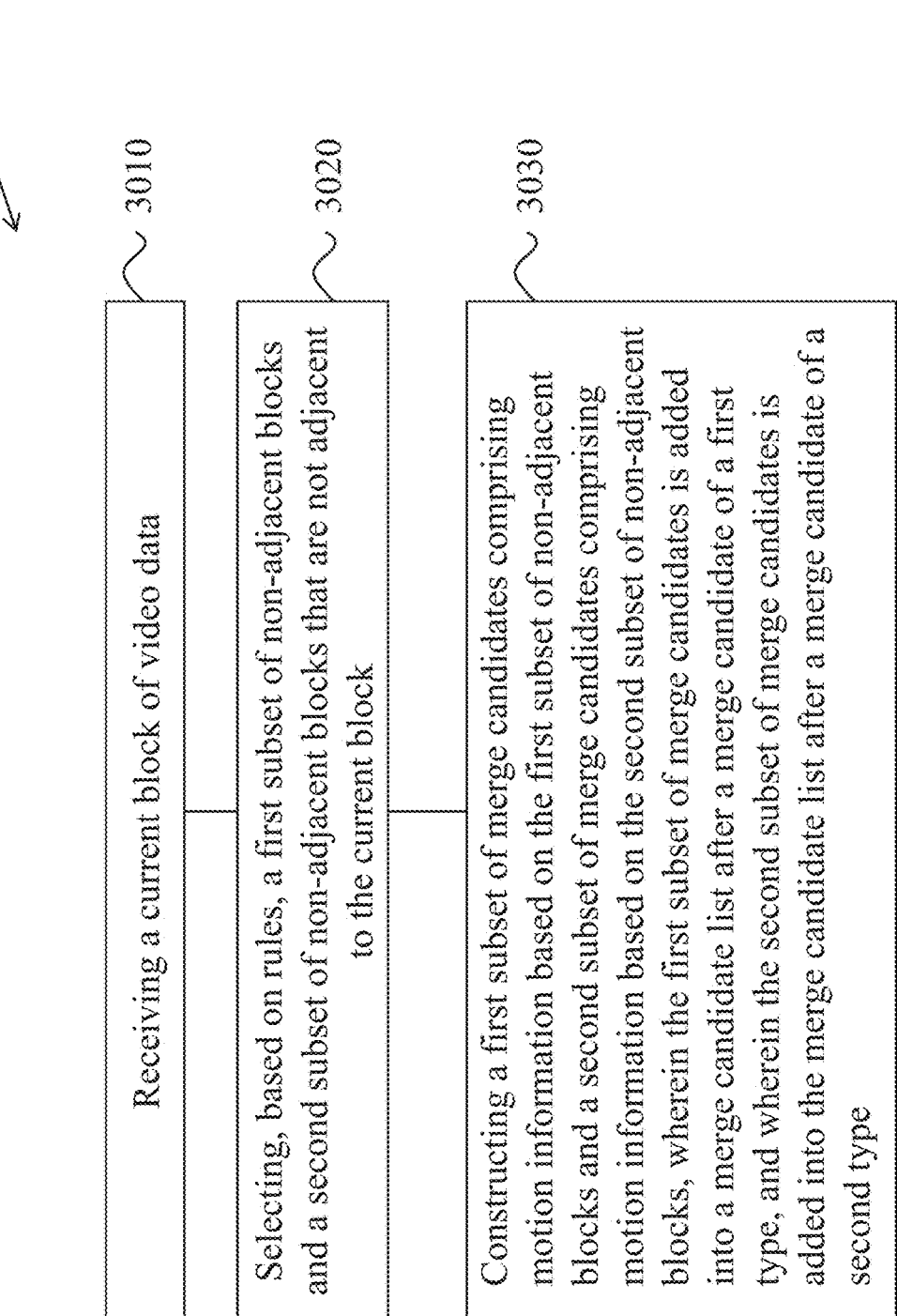

3000

3010

Receiving a current block of video data

3020

Selecting, based on rules, a first subset of non-adjacent blocks and a second subset of non-adjacent blocks that are not adjacent to the current block

3030

Constructing a first subset of merge candidates comprising motion information based on the first subset of non-adjacent blocks and a second subset of merge candidates comprising motion information based on the second subset of non-adjacent blocks, wherein the first subset of merge candidates is added into a merge candidate list after a merge candidate of a first type, and wherein the second subset of merge candidates is added into the merge candidate list after a merge candidate of a second type

FIG. 30

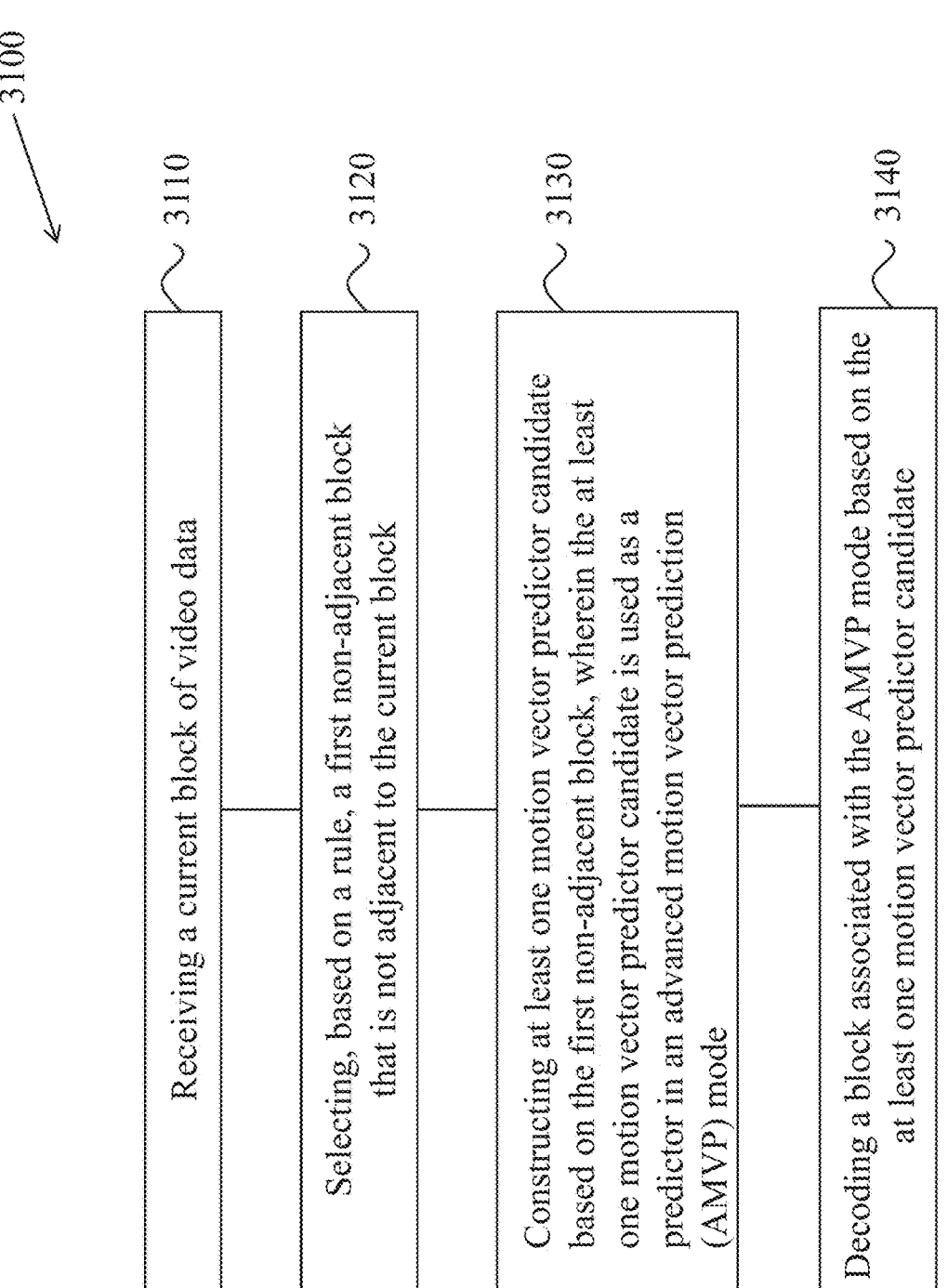

3100

3110 Receiving a current block of video data

3120 Selecting, based on a rule, a first non-adjacent block that is not adjacent to the current block 3130 Constructing at least one motion vector predictor candidate based on the first non-adjacent block, wherein the at least one motion vector predictor candidate is used as a predictor in an advanced motion vector prediction (AMVP) mode 3140 Decoding a block associated with the AMVP mode based on the at least one motion vector predictor candidate

FIG. 31

PRIORITY-BASED NON-ADJACENT MERGE DESIGN

CROSS REFERENCE TO RELATED APPLICATIONS

This application is a continuation of U.S. application Ser. No. 17/139,200, filed on Dec. 31, 2020, which is a continuation of International Application No. PCT/IB2019/055573 filed on Jul. 1, 2019 which claims the priority to and benefits of International Patent Application No. PCT/CN2018/093944, filed on Jul. 1, 2018. All the aforementioned patent applications are hereby incorporated by reference in their entireties.

TECHNICAL FIELD

This patent document is directed generally to image and video coding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to identifying non-adjacent merge candidates to decrease memory and complexity requirements and increase coding efficiency are described. For example, the presently disclosed technology discloses rules to select non-adjacent merge candidates to keep the size of the line buffer under a threshold. The described methods may be applied to both the existing video coding standards (e.g., High Efficiency Video Coding (HEVC)) and future video coding standards or video codecs.

In one representative aspect, the disclosed technology may be used to provide a method for video processing. This method includes receiving a current block of video data; selecting, based on a rule, a first non-adjacent block that is not adjacent to the current block; constructing a first merge candidate comprising motion information based on the first non-adjacent block; identifying a second non-adjacent block that is not adjacent to the current block and different from the first non-adjacent block; based on determining that the second non-adjacent block fails to satisfy the rule, refraining adding a second merge candidate derived from the second non-adjacent block; constructing a merge candidate list based on the first non-adjacent block; and decoding the current block based on the merge candidate list.

In another representative aspect, the disclosed technology may be used to provide another method for video processing. This method includes receiving a current block of video data; selecting, based on a rule, a first non-adjacent block that is not adjacent to the current block; constructing a first merge candidate comprising motion information based on the first non-adjacent block; selecting a second non-adjacent block, wherein the first non-adjacent block and the second non-adjacent block are not adjacent to the current block, wherein the first non-adjacent block is coded with a first mode, and the second non-adjacent block is coded with a second mode, and wherein the first non-adjacent block is selected prior to selecting the second non-adjacent block;

and constructing a second merge candidate comprising motion information based on the second non-adjacent block.

In another representative aspect, the disclosed technology may be used to provide another method for video processing. This method includes receiving a current block of video data; selecting, based on rules, a first subset of non-adjacent blocks and a second subset of non-adjacent blocks that are not adjacent to the current block; and constructing a first subset of merge candidates comprising motion information based on the first subset of non-adjacent blocks and a second subset of merge candidates comprising motion information based on the second subset of non-adjacent blocks, wherein the first subset of merge candidates is added into a merge candidate list after a merge candidate of a first type, and wherein the second subset of merge candidates is added into the merge candidate list after a merge candidate of a second type.

In another representative aspect, the disclosed technology may be used to provide another method for video processing. This method includes receiving a current block of video data; selecting, based on a rule, a first non-adjacent block that is not adjacent to the current block; constructing at least one motion vector predictor candidate based on the first non-adjacent block, wherein the at least one motion vector predictor candidate is used as a predictor in an advanced motion vector prediction (AMVP) mode; and decoding a block associated with the AMVP mode based on the at least one motion vector predictor candidate.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method. Other features that are preferably implemented by various embodiments are described in the present document.

The above and other aspects and features of the disclosed technology are described in greater detail in the drawings, the description and the claims.

BRIEF DESCRIPTION OF THE DRAWINGS

FIGS. 5A and 5B show an example of the subdivisions and a corresponding QTBT (quadtree plus binary tree) for a largest coding unit (LCU).

FIG. 7 shows an example subdivision of a CB based on a QTBT.

FIG. 15 shows an example of generating a combined bi-predictive merge candidate.

FIG. 26 shows exemplary pseudocode for adding non-adjacent merge candidates.

FIG. 27 shows an example of a restricted region for non-adjacent blocks.

FIG. 28 shows a flowchart of an example method for video coding in accordance with the presently disclosed technology.

FIG. 29 shows a flowchart of another example method for video coding in accordance with the presently disclosed technology.

FIG. 30 shows a flowchart of yet another example method for video coding in accordance with the presently disclosed technology.

FIG. 31 shows a flowchart of a further example method for video coding in accordance with the presently disclosed technology.

DETAILED DESCRIPTION

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or motion picture experts group (MPEG)-H Part 2), the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. Example Embodiments of Video Coding

Figure 1:
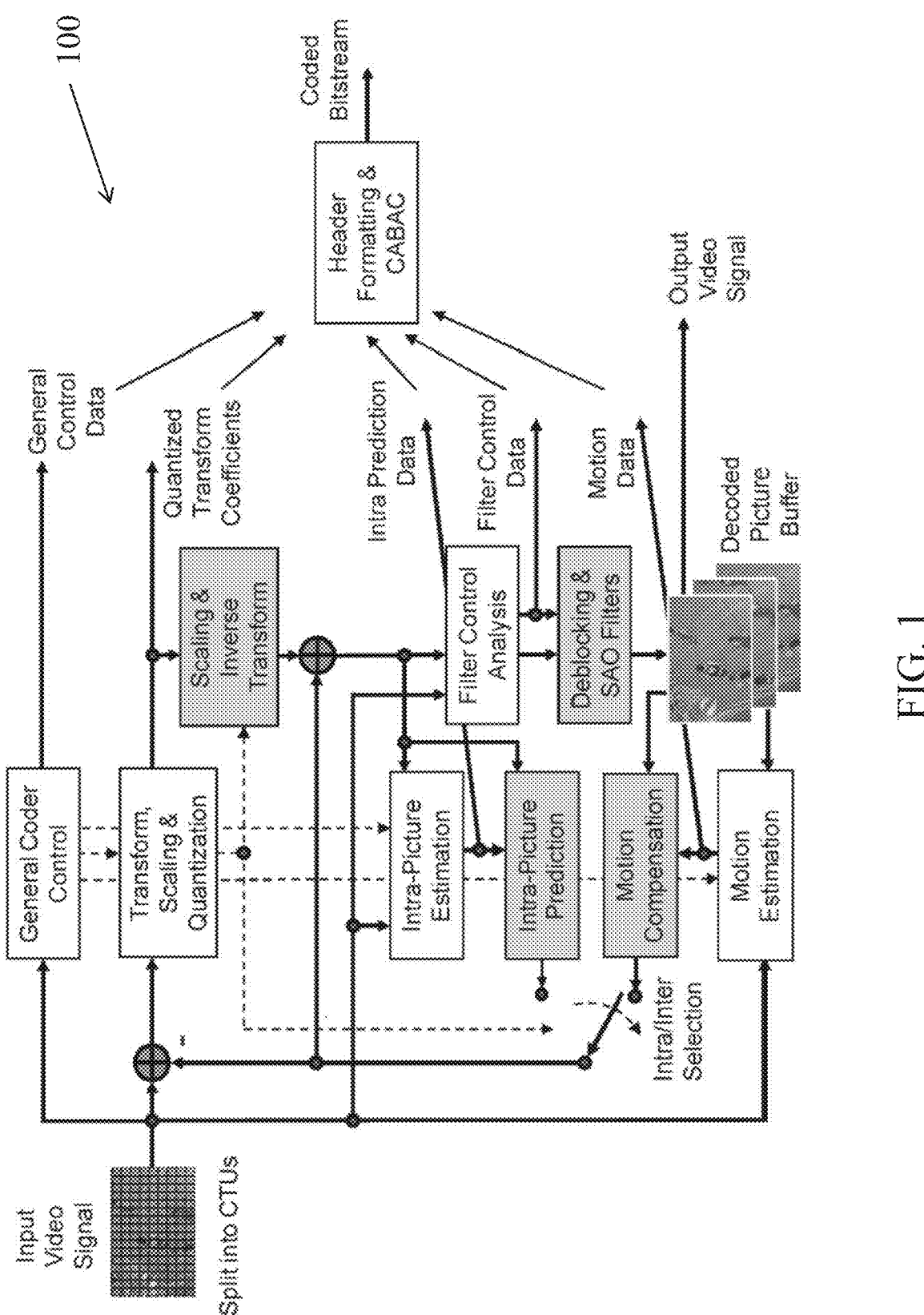
FIG. 1 shows an example block diagram of a typical High Efficiency Video Coding (HEVC) video encoder and decoder.

FIG. 1 shows an example block diagram of a typical HEVC video encoder and decoder. An encoding algorithm producing an HEVC compliant bitstream would typically proceed as follows. Each picture is split into block-shaped regions, with the exact block partitioning being conveyed to the decoder. The first picture of a video sequence (and the first picture at each clean random access point into a video sequence) is coded using only intra-picture prediction (that uses some prediction of data spatially from region-to-region within the same picture, but has no dependence on other pictures). For all remaining pictures of a sequence or between random access points, inter-picture temporally predictive coding modes are typically used for most blocks. The encoding process for inter-picture prediction consists of choosing motion data comprising the selected reference picture and motion vector (MV) to be applied for predicting the samples of each block. The encoder and decoder generate identical inter-picture prediction signals by applying motion compensation (MC) using the MV and mode decision data, which are transmitted as side information.

The residual signal of the intra- or inter-picture prediction, which is the difference between the original block and its prediction, is transformed by a linear spatial transform. The transform coefficients are then scaled, quantized, entropy coded, and transmitted together with the prediction information.

The encoder duplicates the decoder processing loop (see gray-shaded boxes in FIG. 1) such that both will generate identical predictions for subsequent data. Therefore, the quantized transform coefficients are constructed by inverse scaling and are then inverse transformed to duplicate the decoded approximation of the residual signal. The residual is then added to the prediction, and the result of that addition may then be fed into one or two loop filters to smooth out artifacts induced by block-wise processing and quantization. The final picture representation (that is a duplicate of the output of the decoder) is stored in a decoded picture buffer to be used for the prediction of subsequent pictures. In general, the order of encoding or decoding processing of pictures often differs from the order in which they arrive from the source; necessitating a distinction between the decoding order (i.e., bitstream order) and the output order (i.e., display order) for a decoder.

Video material to be encoded by HEVC is generally expected to be input as progressive scan imagery (either due to the source video originating in that format or resulting from deinterlacing prior to encoding). No explicit coding features are present in the HEVC design to support the use of interlaced scanning, as interlaced scanning is no longer used for displays and is becoming substantially less common for distribution. However, a metadata syntax has been provided in HEVC to allow an encoder to indicate that interlace-scanned video has been sent by coding each field (i.e., the even or odd numbered lines of each video frame) of interlaced video as a separate picture or that it has been sent by coding each interlaced frame as an HEVC coded picture. This provides an efficient method of coding interlaced video without burdening decoders with a need to support a special decoding process for it.

1.1. Examples of Partition Tree Structures in H.264/AVC

The core of the coding layer in previous standards was the macroblock, containing a 16×16 block of luma samples and, in the usual case of 4:2:0 color sampling, two corresponding 8×8 blocks of chroma samples.

An intra-coded block uses spatial prediction to exploit spatial correlation among pixels. Two partitions are defined: 16×16 and 4×4.

Figure 2:
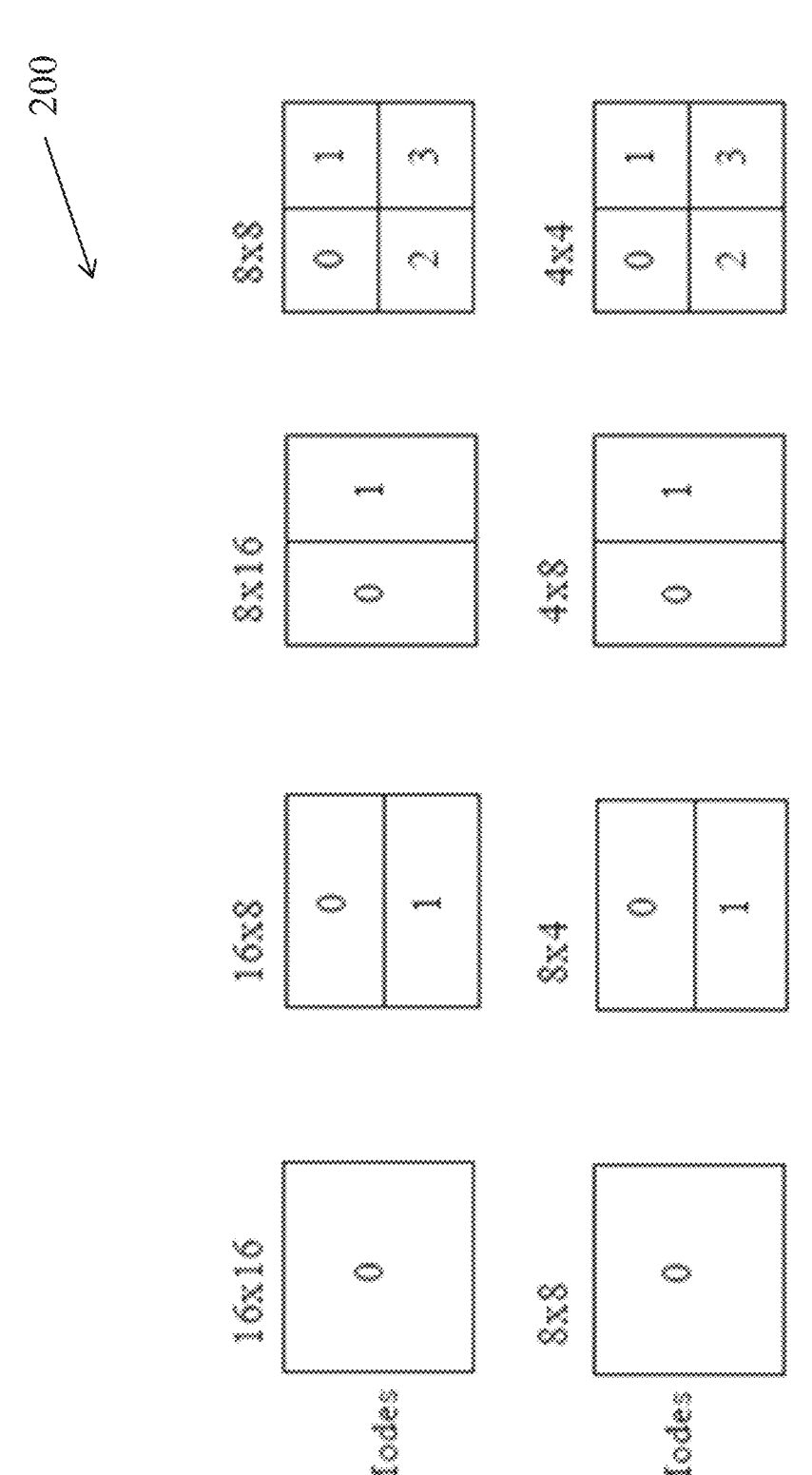
FIG. 2 shows examples of macroblock (MB) partitions in H.264/advanced video coding (AVC).

An inter-coded block uses temporal prediction, instead of spatial prediction, by estimating motion among pictures. Motion can be estimated independently for either 16×16 macroblock or any of its sub-macroblock partitions: 16×8, 8×16, 8×8, 8×4, 4×8, 4×4, as shown in FIG. 2. Only one motion vector (MV) per sub-macroblock partition is allowed.

1.2 Examples of Partition Tree Structures in HEVC

In HEVC, a coding tree unit (CTU) is split into coding units (CUs) by using a quadtree structure denoted as coding tree to adapt to various local characteristics. The decision whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

Certain features involved in hybrid video coding using HEVC include:

(1) Coding tree units (CTUs) and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

(2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

Figure 3:
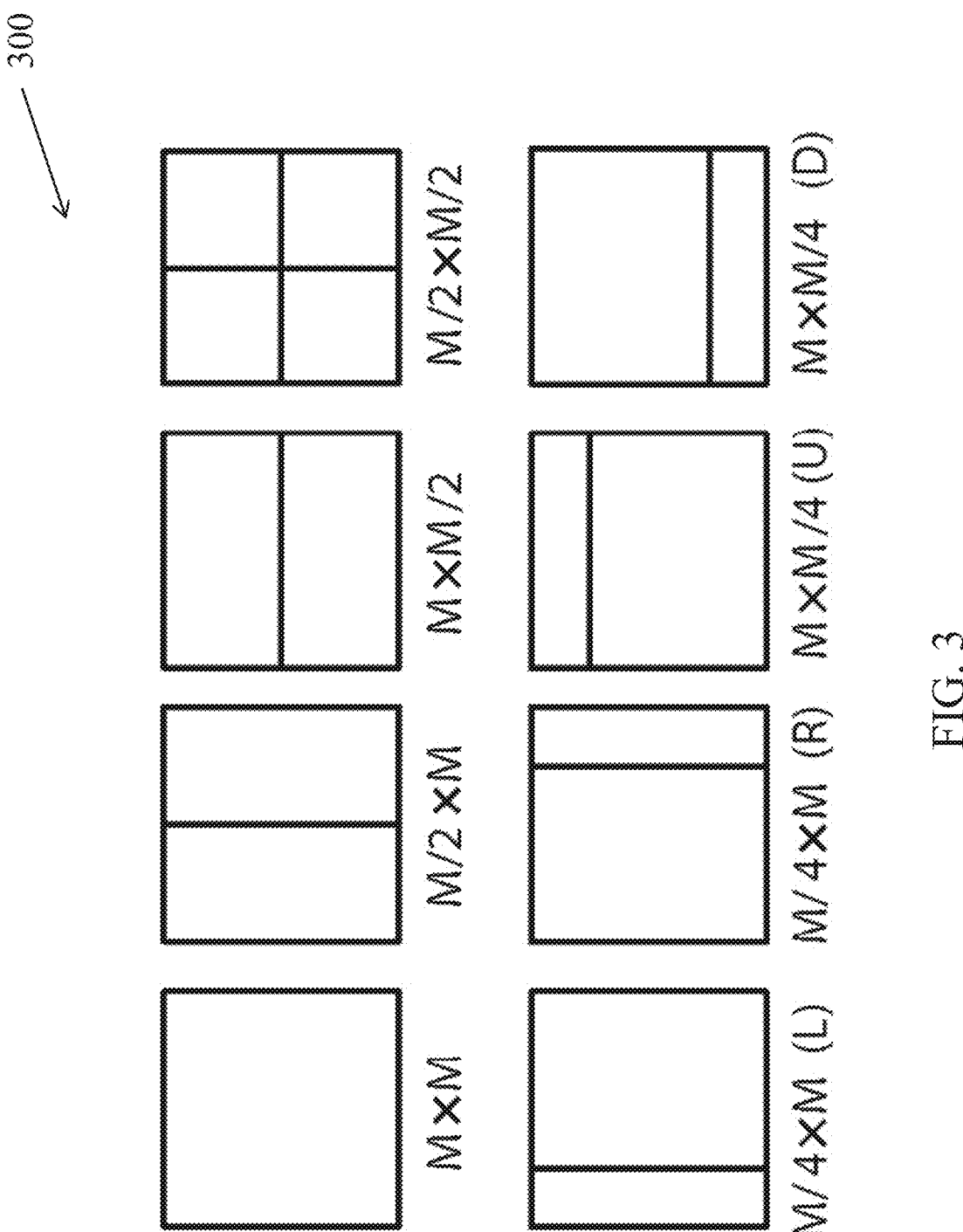
FIG. 3 shows examples of splitting coding blocks (CBs) into prediction blocks (PBs).

(3) Prediction units and prediction blocks (PBs): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples. FIG. 3 shows examples of allowed PBs for an MxM CU.

(4) Transform units (Tus) and transform blocks: The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

1.2.1. Examples of Tree-Structured Partitioning into TBs and TUs

Figures 4A, 4B:
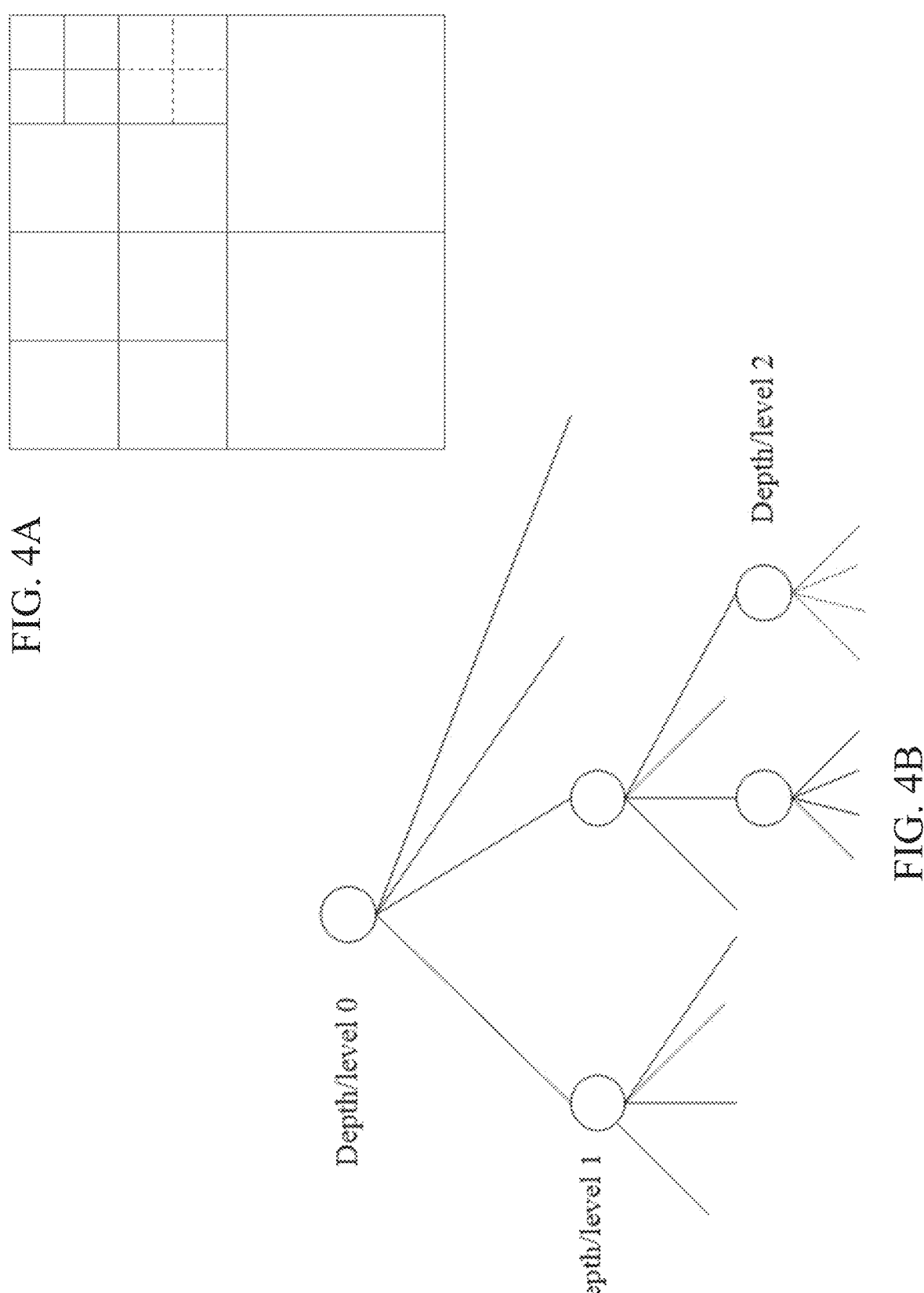
FIGS. 4A and 4B show an example of the subdivision of a coding tree block (CTB) into CBs and transform blocks (TBs), and the corresponding quadtree, respectively.

For residual coding, a CB can be recursively partitioned into transform blocks (TBs). The partitioning is signaled by a residual quadtree. Only square CB and TB partitioning is specified, where a block can be recursively split into quadrants, as illustrated in FIG. 4. For a given luma CB of size M×M, a flag signals whether it is split into four blocks of size M/2×M/2. If further splitting is possible, as signaled by a maximum depth of the residual quadtree indicated in the sequence parameter set (SPS), each quadrant is assigned a flag that indicates whether it is split into four quadrants. The leaf node blocks resulting from the residual quadtree are the transform blocks that are further processed by transform coding. The encoder indicates the maximum and minimum luma TB sizes that it will use. Splitting is implicit when the CB size is larger than the maximum TB size. Not splitting is implicit when splitting would result in a luma TB size smaller than the indicated minimum. The chroma TB size is half the luma TB size in each dimension, except when the luma TB size is 4×4, in which case a single 4×4 chroma TB is used for the region covered by four 4×4 luma TBs. In the case of intra-picture-predicted CUs, the decoded samples of the nearest-neighboring TBs (within or outside the CB) are used as reference data for intra picture prediction.

In contrast to previous standards, the HEVC design allows a TB to span across multiple PBs for inter-picture predicted CUs to maximize the potential coding efficiency benefits of the quadtree-structured TB partitioning.

1.2.2. Parent and Child Nodes

A CTB is divided according to a quad-tree structure, the nodes of which are coding units. The plurality of nodes in a quad-tree structure includes leaf nodes and non-leaf nodes. The leaf nodes have no child nodes in the tree structure (i.e., the leaf nodes are not further split). The, non-leaf nodes include a root node of the tree structure. The root node corresponds to an initial video block of the video data (e.g., a CTB). For each respective non-root node of the plurality of nodes, the respective non-root node corresponds to a video block that is a sub-block of a video block corresponding to a parent node in the tree structure of the respective non-root node. Each respective non-leaf node of the plurality of non-leaf nodes has one or more child nodes in the tree structure.

1.3. Examples of Quadtree Plus Binary Tree Block Structures with Larger CTUs in JEM In some embodiments, future video coding technologies are explored using a reference software known as the Joint Exploration Model (JEM). In addition to binary tree structures, JEM describes quadtree plus binary tree (QTBT) and ternary tree (TT) structures.

1.3.1. Examples of the QTBT Block Partitioning Structure

Figures 5A, 5B:
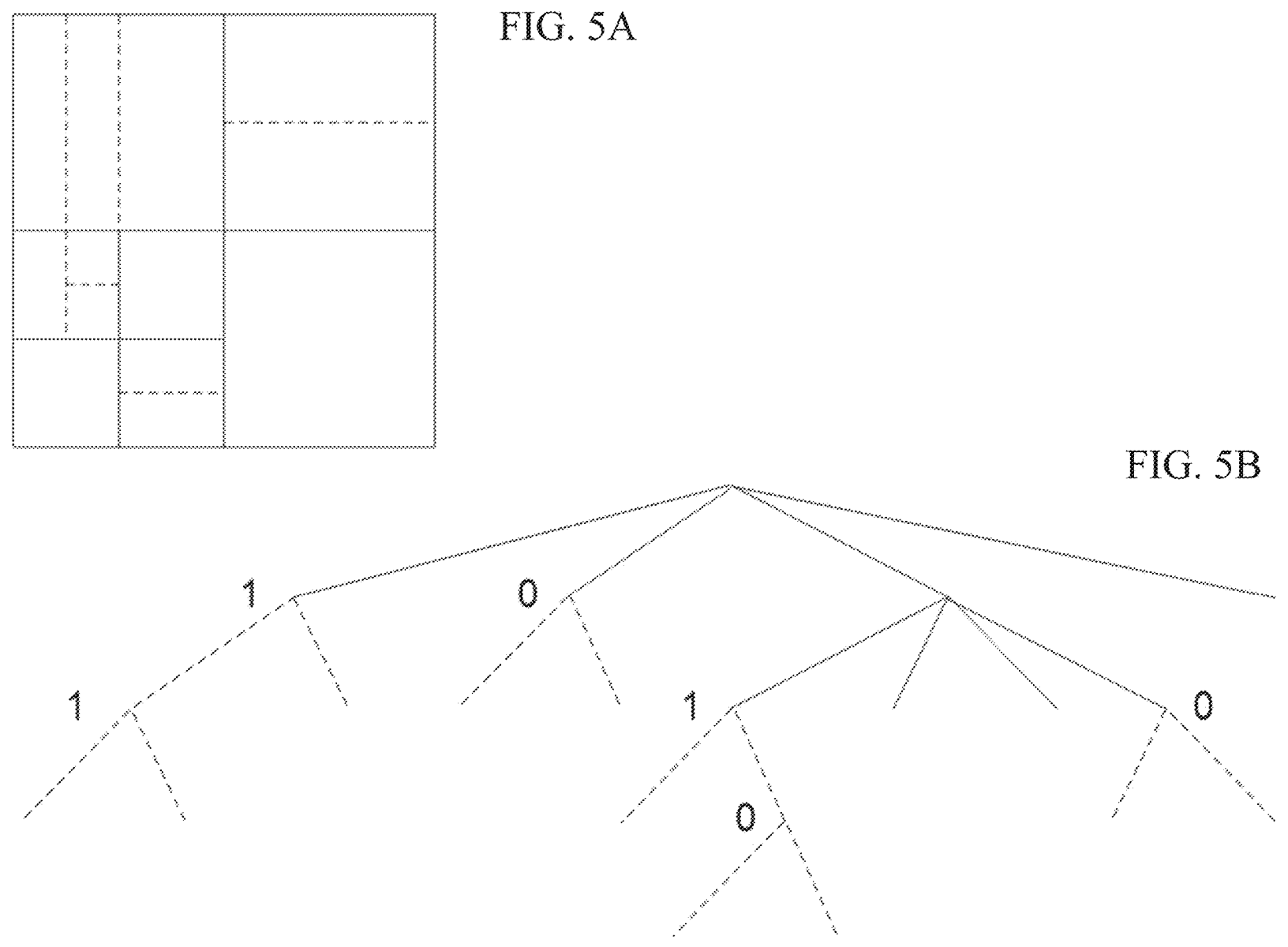

In contrast to HEVC, the QTBT structure removes the concepts of multiple partition types, i.e. it removes the separation of the CU, PU and TU concepts, and supports more flexibility for CU partition shapes. In the QTBT block structure, a CU can have either a square or rectangular shape. As shown in FIG. 5A, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme:

CTU size: the root node size of a quadtree, the same concept as in HEVC

MinQTSize: the minimally allowed quadtree leaf node size

MaxBTSize: the maximally allowed binary tree root node size

MaxBTDepth: the maximally allowed binary tree depth

MinBTSize: the minimally allowed binary tree leaf node size

In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

FIG. 5A shows an example of block partitioning by using QTBT, and FIG. 5B shows the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

1.4. Ternary-Tree (TT) for Versatile Video Coding (VVC)

Figures 6A, 6B, 6C, 6D, 6E:
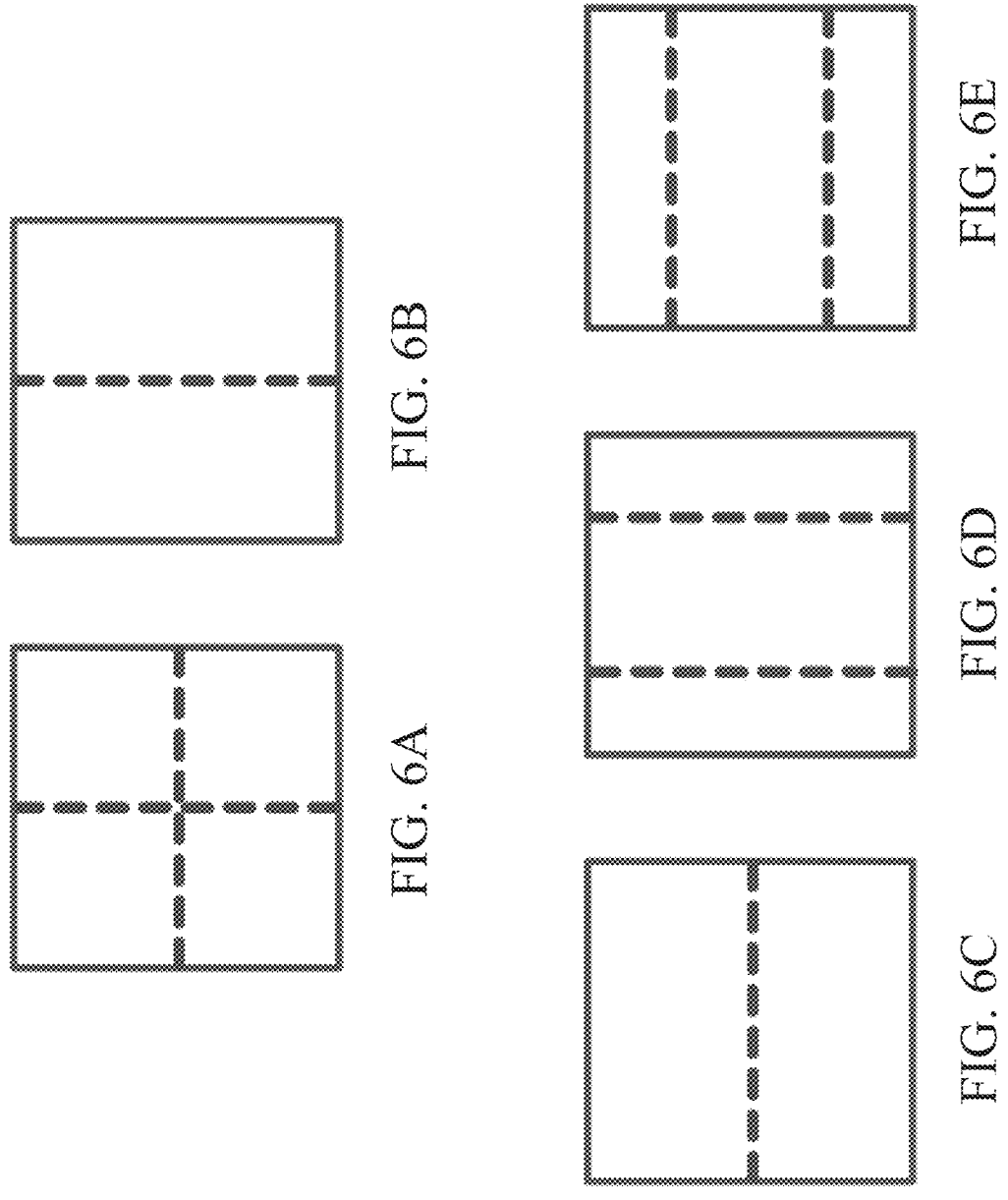
FIGS. 6A-6E show examples of partitioning a coding block.

FIG. 6A shows an example of quad-tree (QT) partitioning, and FIGS. 6B and 6C show examples of the vertical and horizontal binary-tree (BT) partitioning, respectively. In some embodiments, and in addition to quad-trees and binary-trees, ternary tree (TT) partitions, e.g., horizontal and vertical center-side ternary-trees (as shown in FIGS. 6D and 6E) are supported.

In some implementations, two levels of trees are supported: region tree (quad-tree) and prediction tree (binary-tree or ternary-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named 'multiple-type-tree'.

1.5. Examples of Partitioning Structures in Alternate Video Coding Technologies In some embodiments, a tree structure called a Multi-Tree Type (MTT), which is a generalization of the QTBT, is supported. In QTBT, as shown in FIG. 7, a Coding Tree Unit (CTU) is firstly partitioned by a quad-tree structure. The quad-tree leaf nodes are further partitioned by a binary-tree structure.

Figures 8A, 8B, 8C, 8D, 8E, 8F, 8G, 8H, 8I:
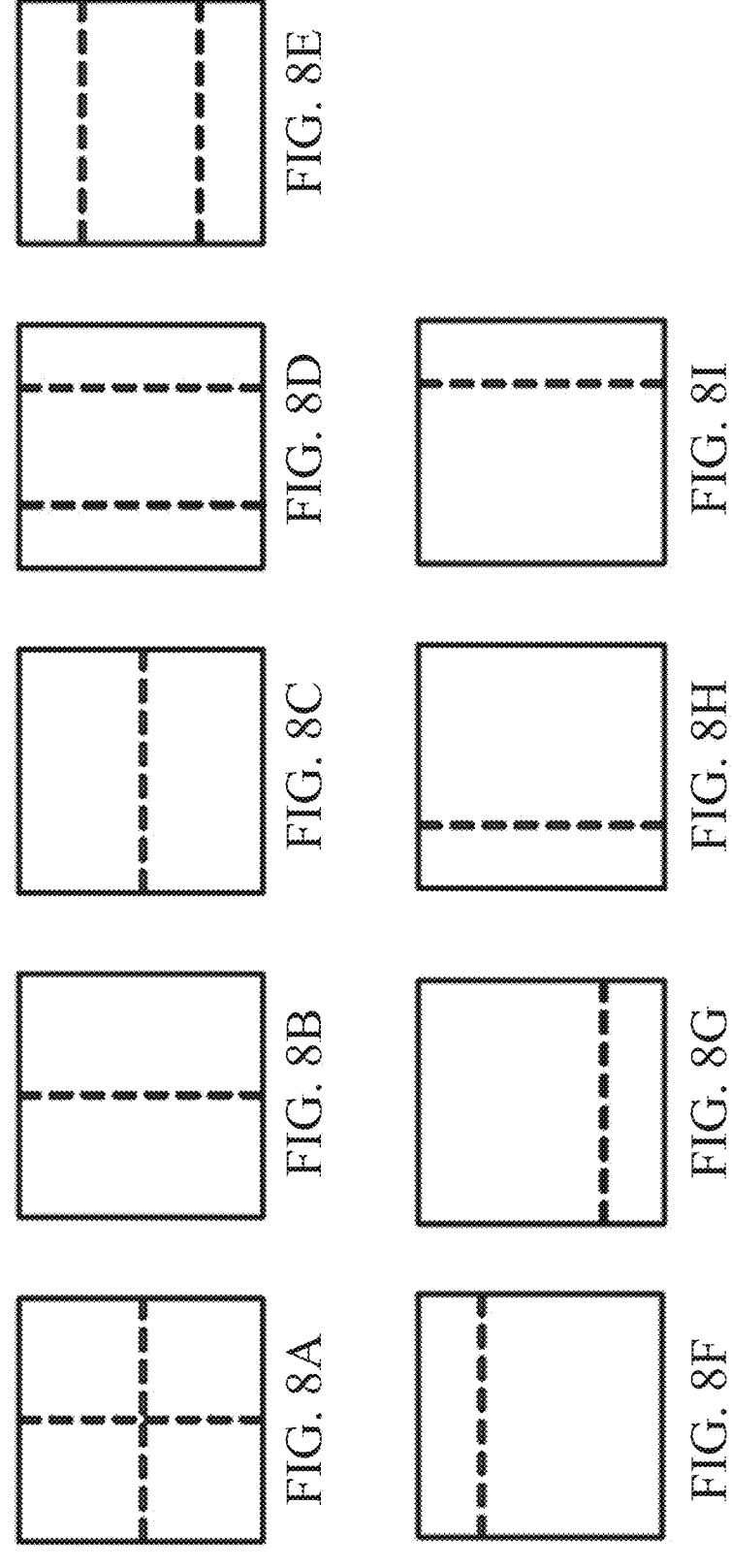
FIGS. 8A-8I show examples of the partitions of a CB supported the multi-tree type (MTT), which is a generalization of the QTBT.

The structure of the MTT constitutes of two types of tree nodes: Region Tree (RT) and Prediction Tree (PT), supporting nine types of partitions, as shown in FIG. 8. A region tree can recursively split a CTU into square blocks down to a 4×4 size region tree leaf node. At each node in a region tree, a prediction tree can be formed from one of three tree types: Binary Tree, Ternary Tree, and Asymmetric Binary Tree. In a PT split, it is prohibited to have a quadtree partition in branches of the prediction tree. As in JEM, the luma tree and the chroma tree are separated in I slices.

2 Examples of Inter-Prediction in HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

2.1 Examples of Prediction Modes

Each inter-predicted PU (prediction unit) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per PU.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

2.1.1 Embodiments of Constructing Candidates for Merge Mode

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation

Step 1.1: Spatial candidates derivation

Step 1.2: Redundancy check for spatial candidates

Step 1.3: Temporal candidates derivation

Step 2: Additional candidates insertion

Step 2.1: Creation of bi-predictive candidates

Step 2.2: Insertion of zero motion candidates

Figure 9:
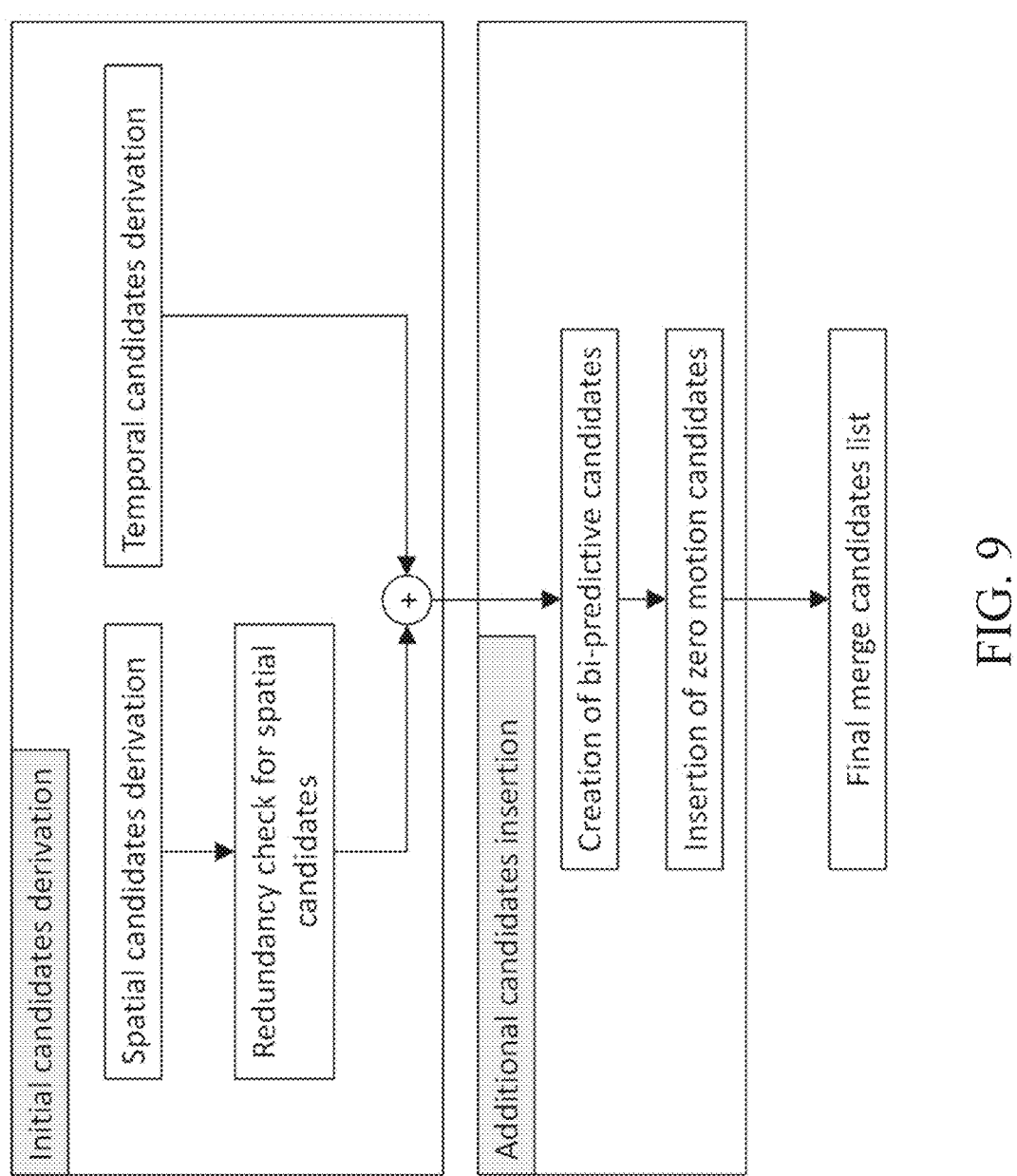
FIG. 9 shows an example of constructing a merge candidate list.

FIG. 9 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

2.1.2 Constructing Spatial Merge Candidates

Figure 10:
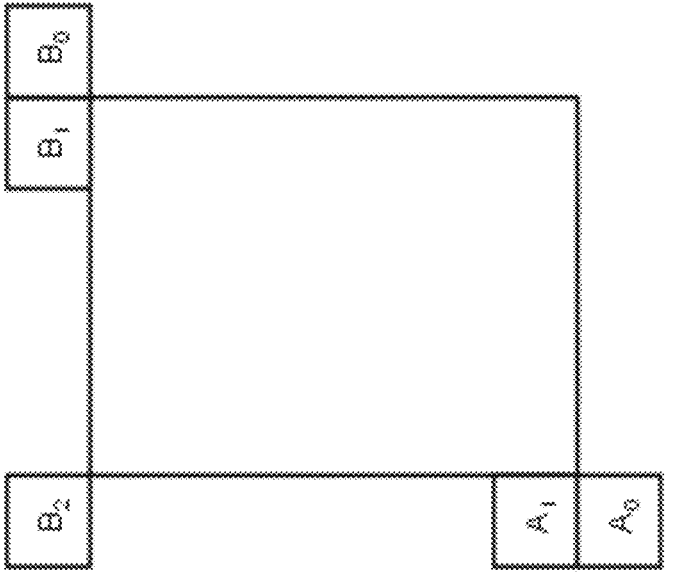
FIG. 10 shows an example of positions of spatial candidates.

In the derivation of spatial merge candidates, a maximum of four merge candidates are selected among candidates located in the positions depicted in FIG. 10. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 11:
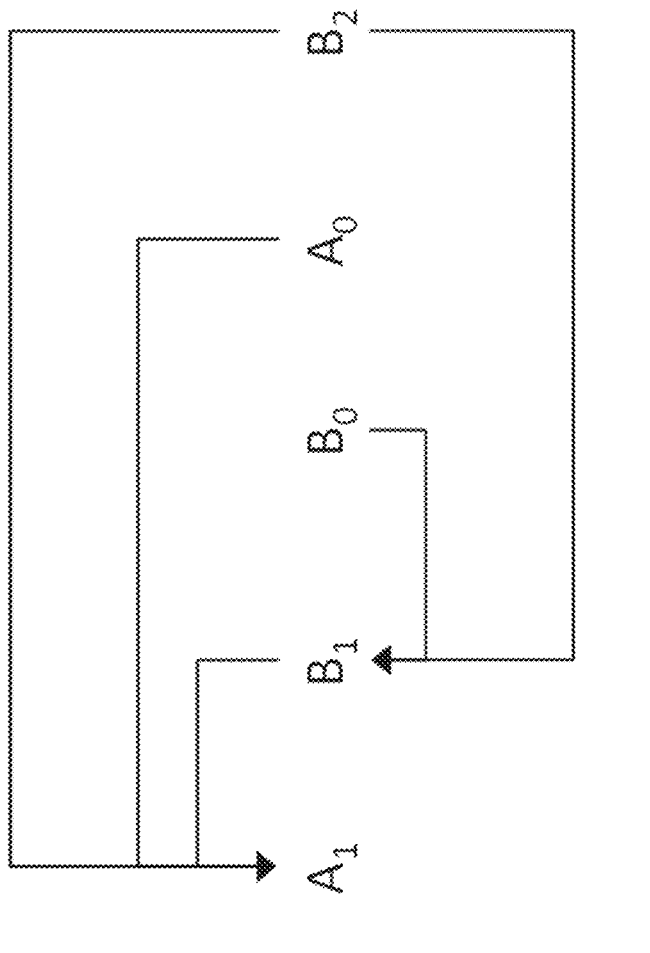
FIG. 11 shows an example of candidate pairs subject to a redundancy check of spatial merge candidates.
Figure 12B:
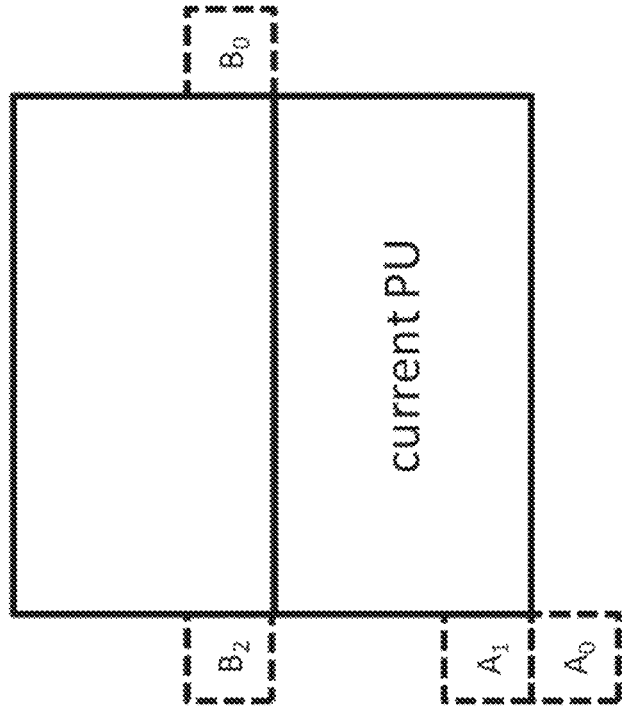
FIGS. 12A and 12B show examples of the position of a second prediction unit (PU) based on the size and shape of the current block.
Figure 12A:
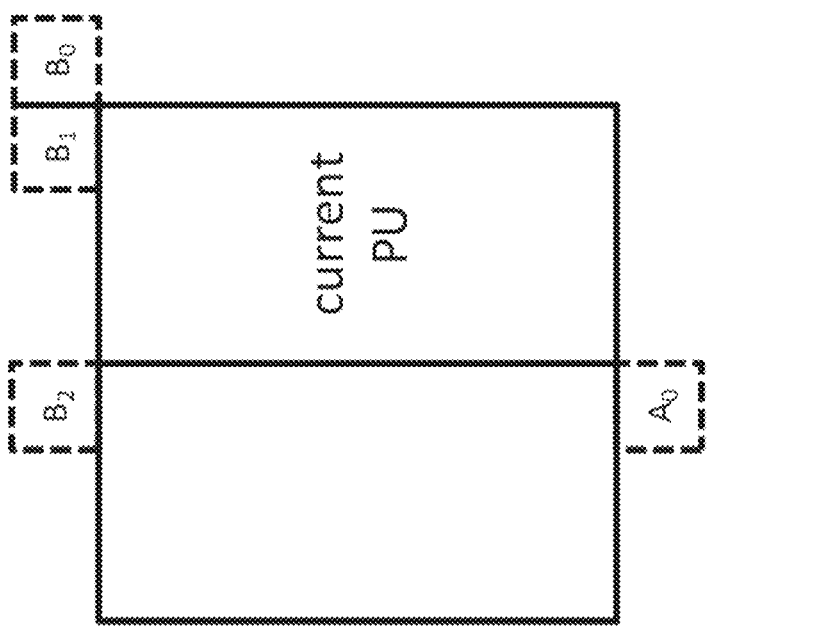

To reduce computational complexity, not all possible candidate pairs are considered in the mentioned redundancy check. Instead only the pairs linked with an arrow in FIG. 11 are considered and a candidate is only added to the list if the corresponding candidate used for redundancy check has not the same motion information. Another source of duplicate motion information is the "second PU" associated with partitions different from 2N×2N. As an example, FIGS. 12A and 12B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position $B_i$ is not considered when the current PU is partitioned as 2N×N.

2.1.3 Constructing Temporal Merge Candidates

In this step, only one candidate is added to the list. Particularly, in the derivation of this temporal merge candidate, a scaled motion vector is derived based on co-located PU belonging to the picture which has the smallest picture order count (POC) difference with current picture within the given reference picture list. The reference picture list to be used for derivation of the co-located PU is explicitly signaled in the slice header.

Figure 13:
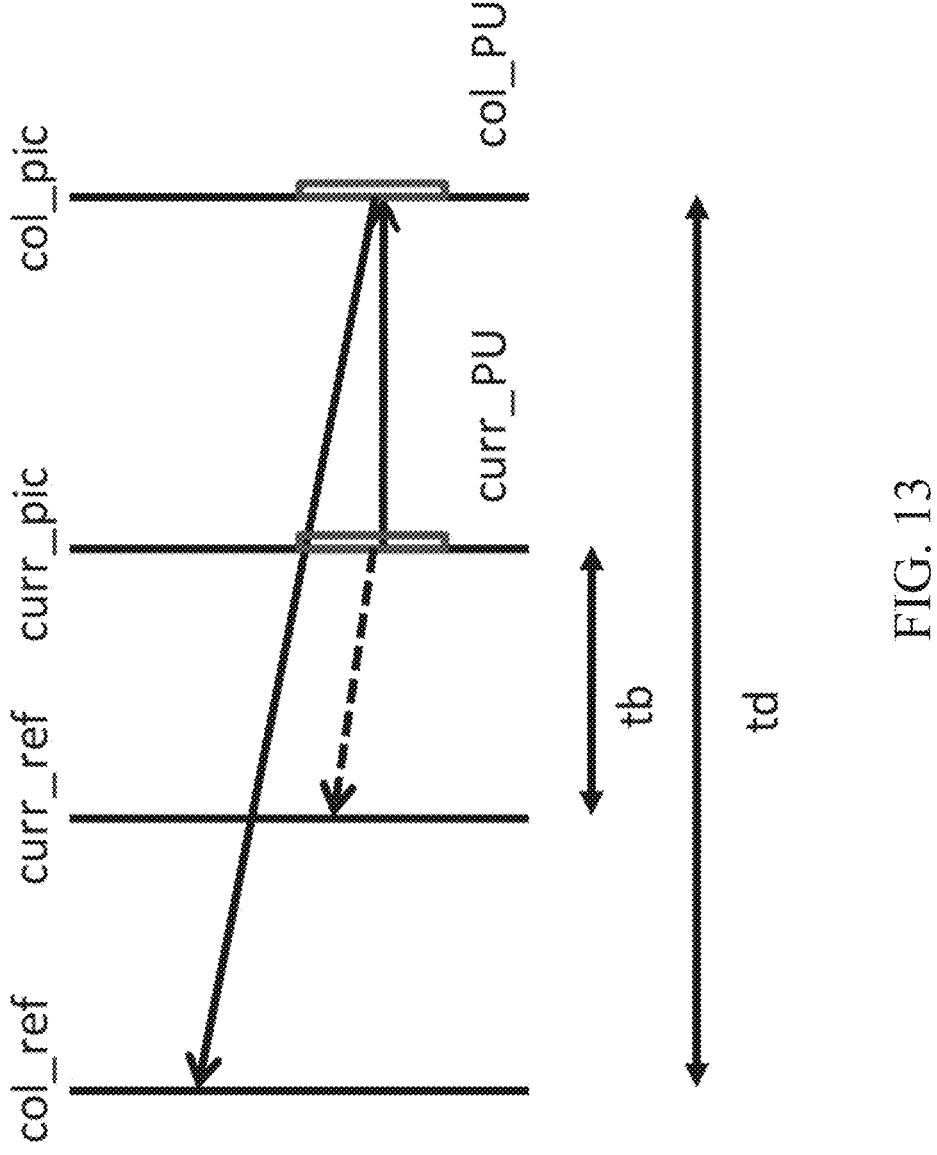
FIG. 13 shows an example of motion vector scaling for temporal merge candidates.

FIG. 13 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 14:
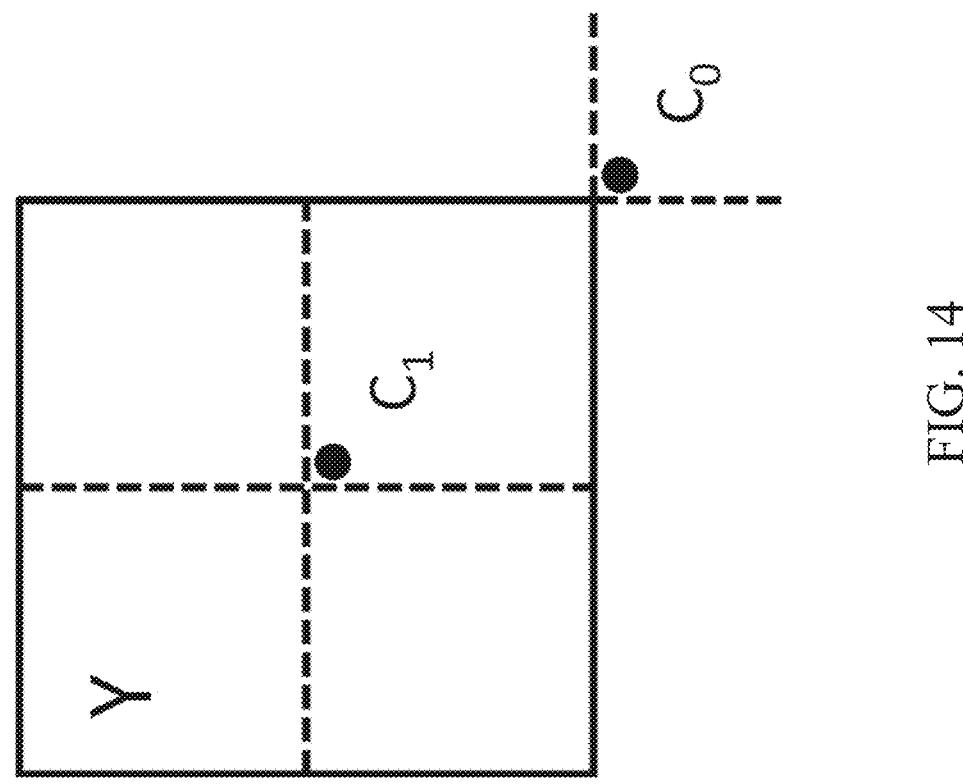
FIG. 14 shows an example of candidate positions for temporal merge candidates.

In the co-located PU (Y) belonging to the reference frame, the position for the temporal candidate is selected between candidates $C_0$ and $C_1$, as depicted in FIG. 14. If PU at position $C_0$ is not available, is intra coded, or is outside of the current CTU, position $C_1$ is used. Otherwise, position $C_0$ is used in the derivation of the temporal merge candidate.

2.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

FIG. 15 shows an example of this process, wherein two candidates in the original list (710, on the left), which have mvL0 and refldxL0 or mvL1 and refldxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

2.1.5 Examples of Motion Estimation Regions for Parallel Processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, a motion estimation region (MER) may be defined. The size of the MER may be signaled in the picture parameter set (PPS) using the "log 2_parallel_merge_level_minus2" syntax element. When a MER is defined, merge candidates falling in the same region are marked as unavailable and therefore not considered in the list construction.

The picture parameter set (PPS) raw byte sequence payload (RBSP) syntax is shown in Table 1, where log 2_parallel_merge_level_minus2 plus 2 specifies the value of the variable Log 2ParMrgLevel, which is used in the derivation process for luma motion vectors for merge mode and the derivation process for spatial merging candidates as specified in an existing video coding standard. The value of log 2_parallel_merge_level_minus2 shall be in the range of 0 to CtbLog 2SizeY−2, inclusive.

The variable Log 2ParMrgLevel is derived as follows:

Log 2ParMrgLevel=log 2_parallel_merge_level_minus2+2

Note that the value of Log 2ParMrgLevel indicates the built-in capability of parallel derivation of the merging candidate lists. For example, when Log 2ParMrgLevel is equal to 6, the merging candidate lists for all the prediction units (PUs) and coding units (CUs) contained in a 64×64 block can be derived in parallel.

TABLE 1

| General picture parameter set RBSP syntax | |
|---|---|
| pic_parameter_set_rbsp( ) { | Descriptor |
| pps_pic_parameter_set_id | ue(v) |
| pps_seq_parameter_set_id | ue(v) |
| dependent_slice_segments_enabled_flag | u(1) |
| ... | |
| pps_scaling_list_data_present_flag | u(1) |
| if( pps_scaling_list_data_present_flag ) | |
| scaling_list_data( ) | |
| lists_modification_present_flag | u(1) |
| log2_parallel_merge_level_minus2 | ue(v) |
| slice_segment_header_extension_present_flag | u(1) |
| pps_extension_present_flag | u(1) |
| ... | |
| rbsp_trailing_bits( ) | |
| } | |

2.2 Embodiments of Motion Vector Prediction

Motion vector prediction exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly, with merge index signaling, the index of the best motion vector candidate is encoded using truncated unary.

2.2.1 Examples of Constructing Motion Vector Prediction Candidates

Figure 16:
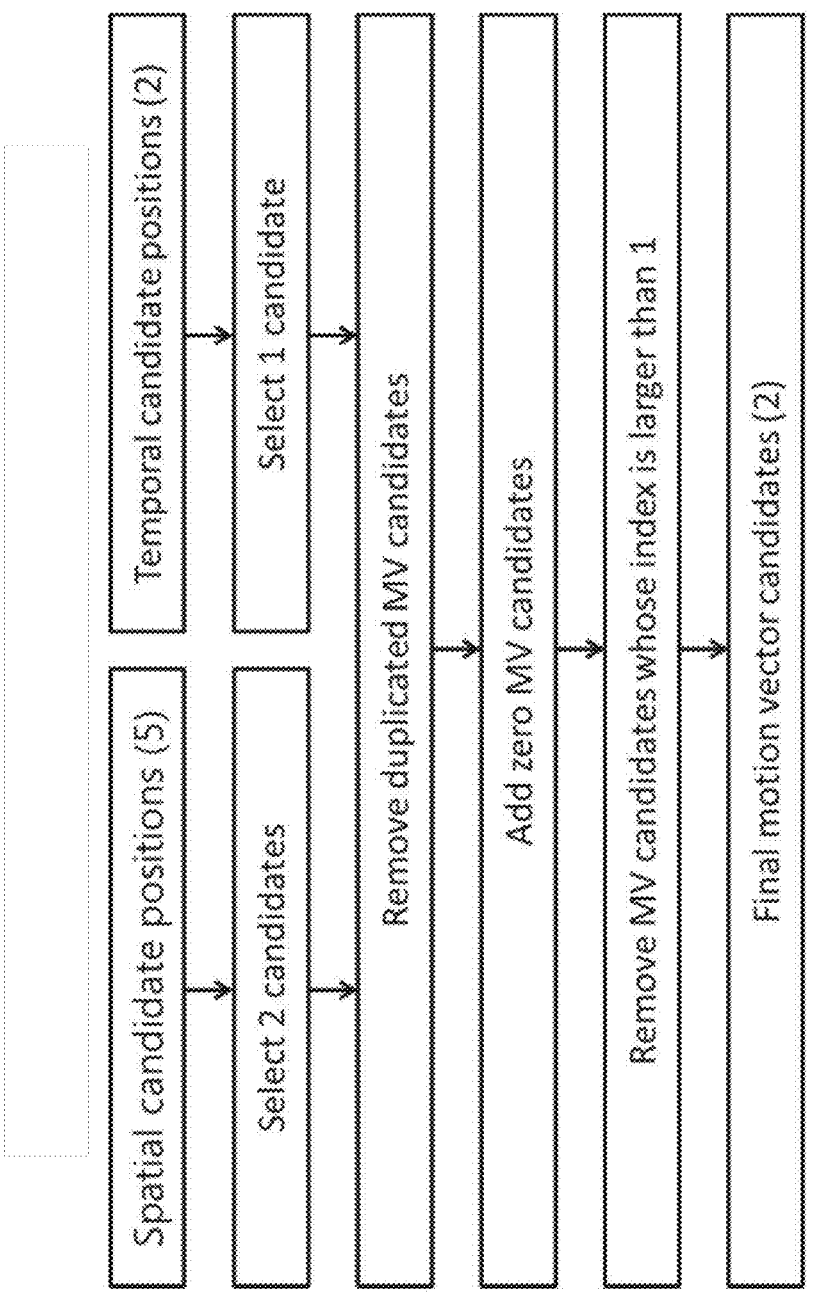
FIG. 16 shows an example of constructing motion vector prediction candidates.

FIG. 16 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 10.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.2.2 Constructing Spatial Motion Vector Candidates

In the derivation of spatial motion vector candidates, a maximum of two candidates are considered among five potential candidates, which are derived from PUs located in positions as previously shown in FIG. 10, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No spatial scaling
(1) Same reference picture list, and same reference picture index (same POC)
(2) Different reference picture list, but same reference picture (same POC)

Spatial scaling
(3) Same reference picture list, but different reference picture (different POC)
(4) Different reference picture list, and different reference picture (different POC)

The no-spatial-scaling cases are checked first followed by the cases that allow spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 17:
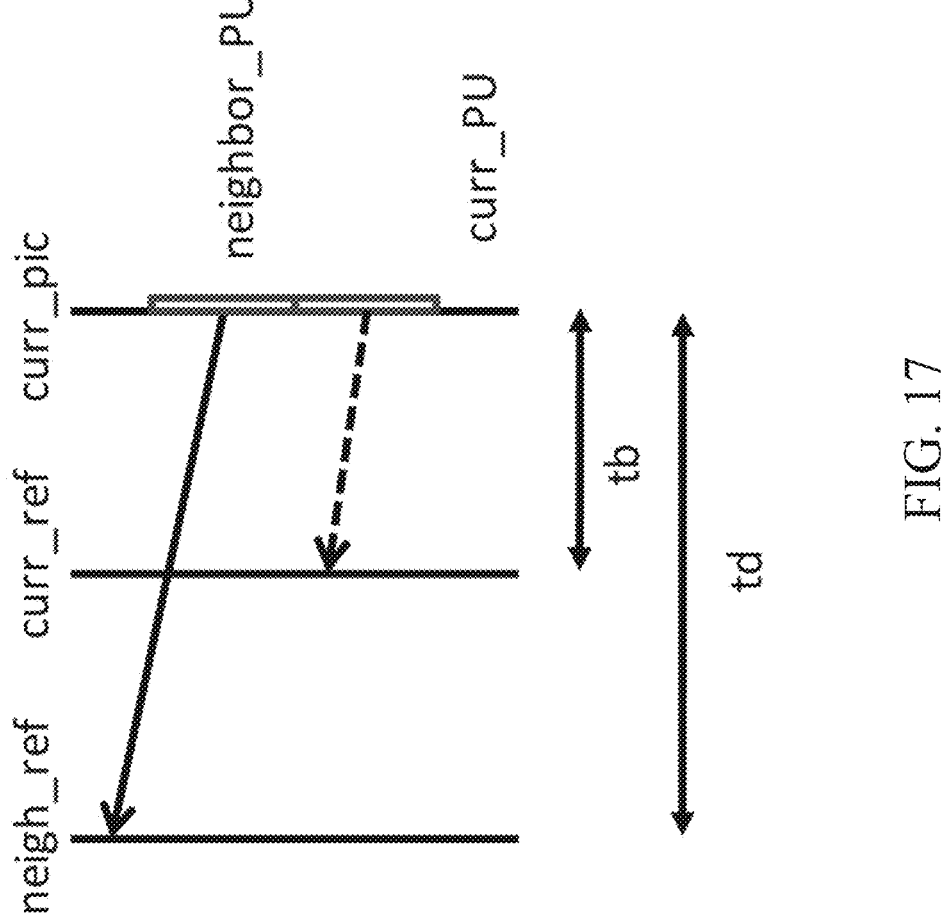
FIG. 17 shows an example of motion vector scaling for spatial motion vector candidates.

As shown in the example in FIG. 17, for the spatial scaling case, the motion vector of the neighbouring PU is scaled in a similar manner as for temporal scaling. One difference is that the reference picture list and index of current PU is given as input; the actual scaling process is the same as that of temporal scaling.

2.2.3 Constructing Temporal Motion Vector Candidates

Apart from the reference picture index derivation, all processes for the derivation of temporal merge candidates are the same as for the derivation of spatial motion vector candidates (as shown in the example in FIG. 14). In some embodiments, the reference picture index is signaled to the decoder.

2.2.4 Signaling of AMVP Information

For the AMVP mode, four parts may be signalled in the bitstream, e.g., prediction direction, reference index, motion vector difference (MVD) and my predictor candidate index, which are described in the context of the syntax shown in Table 2 and Table 3.

TABLE 2

Motion vector difference syntax

| prediction unit( x0, y0, nPbW, nPbH ) { | Descriptor |
|---|---|
| if( cu_skip_flag[ x0 ][ y0 ] ) { | |
| if( MaxNumMergeCand > 1 ) | |
| merge_idx[ x0 ][ y0 ] | ae(v) |
| } else { /* MODE_INTER */ | |
| merge_flag[ x0 ][ y0 ] | ae(v) |
| if( merge_flag[ x0 ][ y0 ] ) { | |
| if( MaxNumMergeCand > 1 ) | |
| merge_idx[ x0 ][ y0 ] | ae(v) |
| } else { | |
| if( slice_type = = B ) | |
| inter_pred_idc[ x0 ][ y0 ] | ae(v) |
| if( inter_pred_idc[ x0 ][ y0 ] = PRED_L1 ) { | |
| if( num_ref_idx_l0_active_minus1 > 0 ) | |
| ref_idx_l0[ x0 ][ y0 ] | ae(v) |
| mvd_coding( x0, y0, 0 ) | |
| mvp_l0_flag[ x0 ][ y0 ] | ae(v) |
| } | |
| if( inter _pred_idc[ x0 ][ y0 ] = PRED_L0 ) { | |
| if( num_ref_idx_l1_active_minus1 > 0 ) | |
| ref_idx_l1[ x0 ][ y0 ] | ae(v) |
| if( mvd_l1_zero_flag && inter_pred_idc[ x0 ][ y0 ] == PRED_BI ) { | |
| MvdL1[ x0 ][ y0 ][ 0 ] = 0 | |
| MvdL1[ x0 ][ y0 ][ 1 ] = 0 | |
| } else | |
| mvd_coding( x0, y0, 1 ) | |
| mvp_l1_flag[ x0 ][ y0 ] | ae(v) |
| } | |
| } | |
| } | |
| } | |

TABLE 3

Motion vector difference semantics

| mvd_coding( x0, y0, refList ) { | Descriptor |
|---|---|
| abs_mvd_greater0_flag[ 0 ] | ae(v) |
| abs_mvd_greater0_flag[ 1 ] | ae(v) |
| if( abs_mvd_greater0_flag[ 0 ] ) | |
| abs_mvd_greater1_flag[ 0 ] | ae(v) |
| if( abs_mvd_greater0_flag[ 1 ] ) | |
| abs_mvd_greater1_flag[ 1 ] | ae(v) |
| if( abs_mvd_greater0_flag[ 0 ] ) { | |
| if( abs_mvd_greater1_flag[ 0 ] ) | |
| abs_mvd_minus2[ 0 ] | ae(v) |
| mvd_sign_flag[ 0 ] | ae(v) |
| } | |

TABLE 3-continued

Motion vector difference semantics

| mvd_coding( x0, y0, refList ) { | Descriptor |
|---|---|
| if( abs_mvd_greater0_flag[ 1 ] ) { | |
| if( abs_mvd_greater1_flag[ 1 ] ) | |
| abs_mvd_minus2[ 1 ] | ae(v) |
| mvd_sign_flag[ 1 ] | ae(v) |
| } | |
| } | |

3 Examples of Inter Prediction Methods in Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

3.1 Examples of Sub-CU Based Motion Vector Prediction

In the JEM with quadtrees plus binary trees (QTBT), each CU can have at most one set of motion parameters for each prediction direction. In some embodiments, two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector. In some embodiments, and to preserve more accurate motion field for sub-CU motion prediction, the motion compression for the reference frames may be disabled.

3.1.1 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 18:
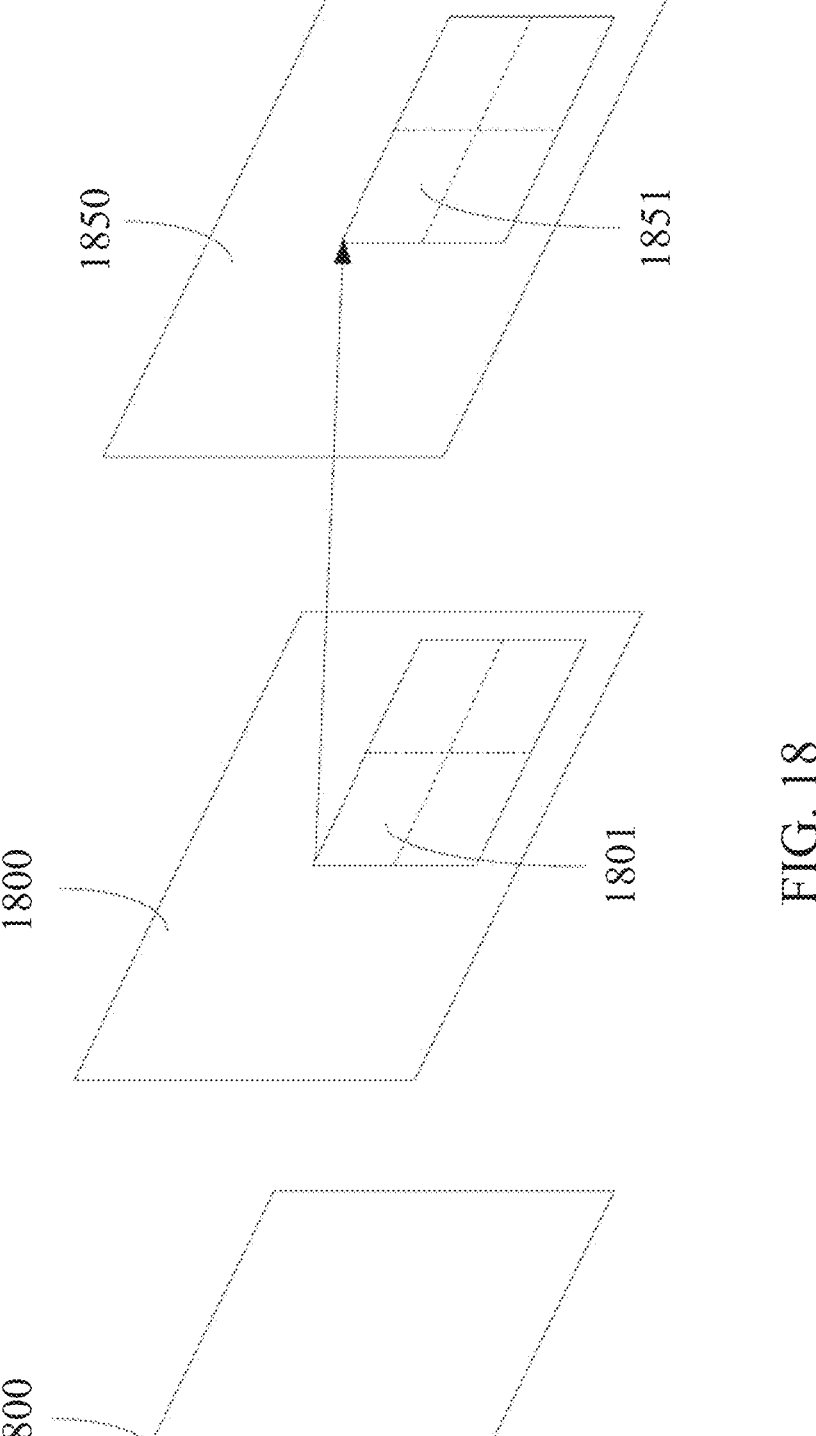
FIG. 18 shows an example of motion prediction using the alternative temporal motion vector prediction (ATMVP) algorithm for a coding unit (CU).

FIG. 18 shows an example of ATMVP motion prediction process for a CU 1800. The ATMVP method predicts the motion vectors of the sub-CUs 1801 within a CU 1800 in two steps. The first step is to identify the corresponding block 1851 in a reference picture 1850 with a temporal vector. The reference picture 1850 is also referred to as the motion source picture. The second step is to split the current CU 1800 into sub-CUs 1801 and obtain the motion vectors as well as the reference indices of each sub-CU from the block corresponding to each sub-CU.

In the first step, a reference picture 1850 and the corresponding block is determined by the motion information of the spatial neighboring blocks of the current CU 1800. To avoid the repetitive scanning process of neighboring blocks, the first merge candidate in the merge candidate list of the current CU 1800 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

Figure 19:
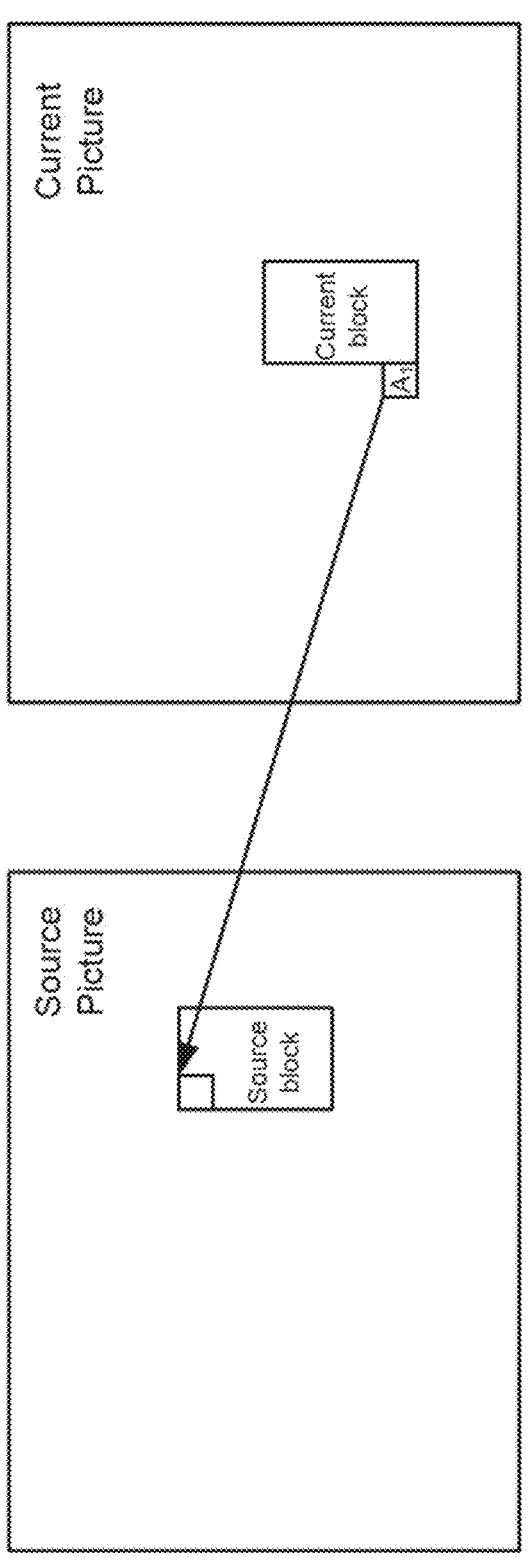
FIG. 19 shows an example of the identification of a source block and source picture

In one example, if the first merge candidate is from the left neighboring block (i.e., A1 in FIG. 19), the associated MV and reference picture are utilized to identify the source block and source picture.

In the second step, a corresponding block of the sub-CU 1851 is identified by the temporal vector in the motion source picture 1850, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1-X) for each sub-CU.

3.1.2 Examples of Spatial-Temporal Motion Vector Prediction (STMVP)

Figure 20:
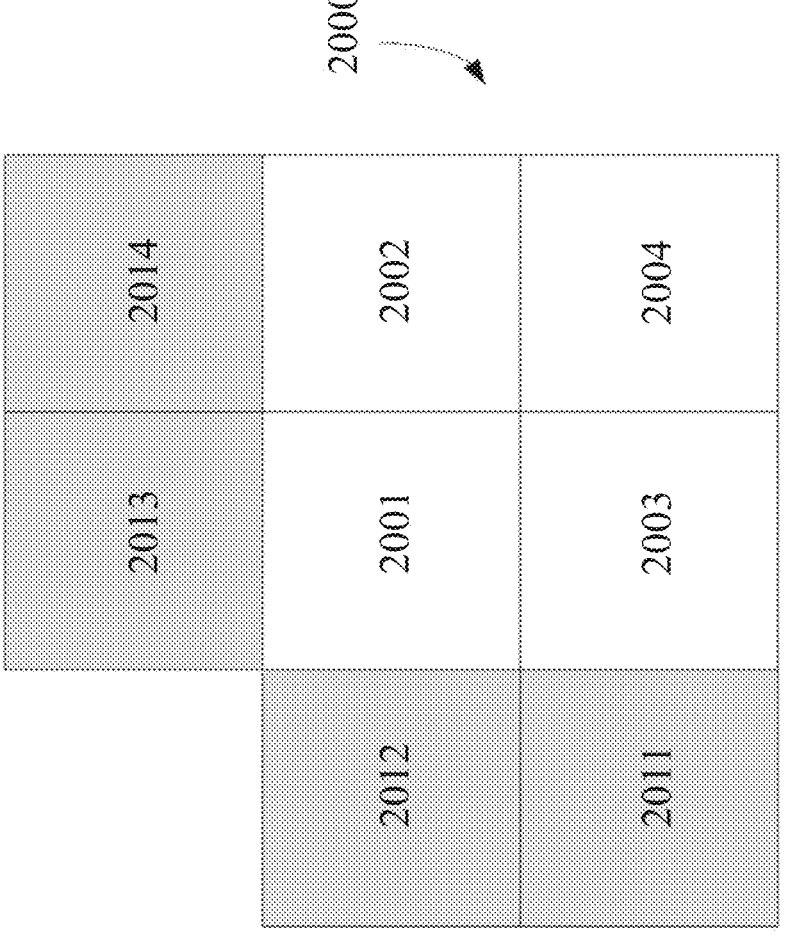
FIG. 20 shows an example of a coding unit (CU) with sub-blocks and neighboring blocks used by the spatial-temporal motion vector prediction (STMVP) algorithm.

In the STMVP method, the motion vectors of the sub-CUs are derived recursively, following raster scan order. FIG. 20 shows an example of one CU with four sub-blocks and neighboring blocks. Consider an 8×8 CU 2000 that includes four 4×4 sub-CUs A (2001), B (2002), C (2003), and D (2004). The neighboring 4×4 blocks in the current frame are labelled as a (2011), b (2012), c (2013), and d (2014).

The motion derivation for sub-CU A starts by identifying its two spatial neighbors. The first neighbor is the N×N block above sub-CU A 1101 (block c 2013). If this block c (2013) is not available or is intra coded the other N×N blocks above sub-CU A (2001) are checked (from left to right, starting at block c 2013). The second neighbor is a block to the left of the sub-CU A 2001 (block b 2012). If block b (2012) is not available or is intra coded other blocks to the left of sub-CU A 2001 are checked (from top to bottom, staring at block b 2012). The motion information obtained from the neighboring blocks for each list is scaled to the first reference frame for a given list. Next, temporal motion vector predictor (TMVP) of sub-block A 2001 is derived by following the same procedure of TMVP derivation as specified in HEVC. The motion information of the collocated block at block D 2004 is fetched and scaled accordingly. Finally, after retrieving and scaling the motion information, all available motion vectors are averaged separately for each reference list. The averaged motion vector is assigned as the motion vector of the current sub-CU.

3.1.3 Examples of Sub-CU Motion Prediction Mode Signaling

In some embodiments, the sub-CU modes are enabled as additional merge candidates and there is no additional syntax element required to signal the modes. Two additional merge candidates are added to merge candidates list of each CU to represent the ATMVP mode and STMVP mode. In other embodiments, up to seven merge candidates may be used, if the sequence parameter set indicates that ATMVP and STMVP are enabled. The encoding logic of the additional merge candidates is the same as for the merge candidates in the HM, which means, for each CU in P or B slice, two more rate distortion (RD) checks may be needed for the two additional merge candidates. In some embodiments, e.g., JEM, all bins of the merge index are context coded by CABAC (Context-based Adaptive Binary Arithmetic Coding). In other embodiments, e.g., HEVC, only the first bin is context coded and the remaining bins are context by-pass coded.

3.2 Examples of Adaptive Motion Vector Difference Resolution

In some embodiments, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU.

When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM:

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 Luma Sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

3.3 Examples of Pattern Matched Motion Vector Derivation (PMMVD)

The PMMVD mode is a special merge mode based on the Frame-Rate Up Conversion (FRUC) method. With this mode, motion information of a block is not signaled but derived at decoder side.

A FRUC flag can be signaled for a CU when its merge flag is true. When the FRUC flag is false, a merge index can be signaled and the regular merge mode is used. When the FRUC flag is true, an additional FRUC mode flag can be signaled to indicate which method (e.g., bilateral matching or template matching) is to be used to derive motion information for the block.

At the encoder side, the decision on whether using FRUC merge mode for a CU is based on RD cost selection as done for normal merge candidate. For example, multiple matching modes (e.g., bilateral matching and template matching) are checked for a CU by using RD cost selection. The one leading to the minimal cost is further compared to other CU modes. If a FRUC matching mode is the most efficient one, FRUC flag is set to true for the CU and the related matching mode is used.

Typically, motion derivation process in FRUC merge mode has two steps: a CU-level motion search is first performed, then followed by a Sub-CU level motion refinement. At CU level, an initial motion vector is derived for the whole CU based on bilateral matching or template matching. First, a list of MV candidates is generated and the candidate that leads to the minimum matching cost is selected as the starting point for further CU level refinement. Then a local search based on bilateral matching or template matching around the starting point is performed. The MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in Eq. (1), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \qquad \text{Eq. (1)}$$

Figure 21:
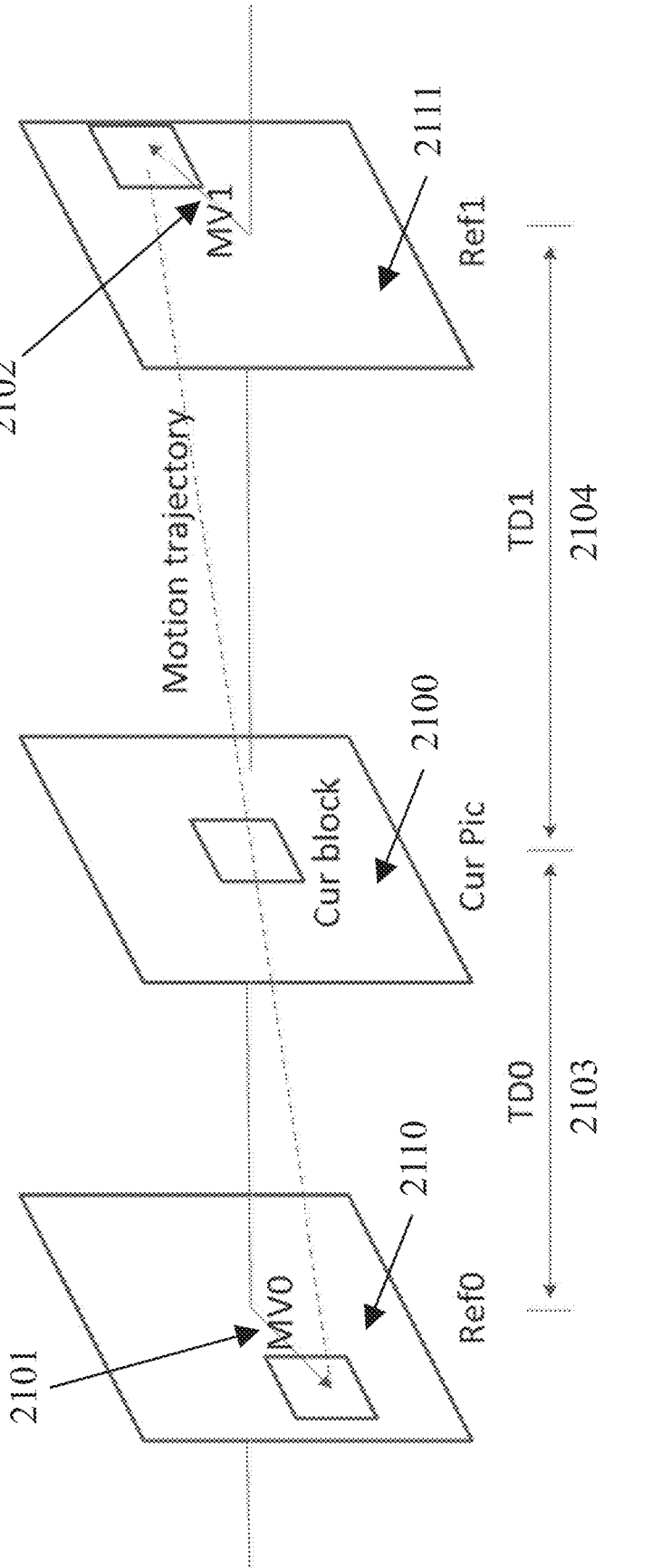
FIG. 21 shows an example of bilateral matching in pattern matched motion vector derivation (PMMVD) mode, which is a special merge mode based on the frame-rate up conversion (FRUC) algorithm.

FIG. 21 shows an example of bilateral matching used in the Frame-Rate Up Conversion (FRUC) method. The bilateral matching is used to derive motion information of the current CU by finding the closest match between two blocks along the motion trajectory of the current CU (2100) in two different reference pictures (2110, 2111). Under the assumption of continuous motion trajectory, the motion vectors MV0 (2101) and MV1 (2102) pointing to the two reference blocks are proportional to the temporal distances, e.g., TD0 (2103) and TD1 (2104), between the current picture and the two reference pictures. In some embodiments, when the current picture 2100 is temporally between the two reference pictures (2110, 2111) and the temporal distance from the current picture to the two reference pictures is the same, the bilateral matching becomes mirror based bi-directional MV.

Figure 22:
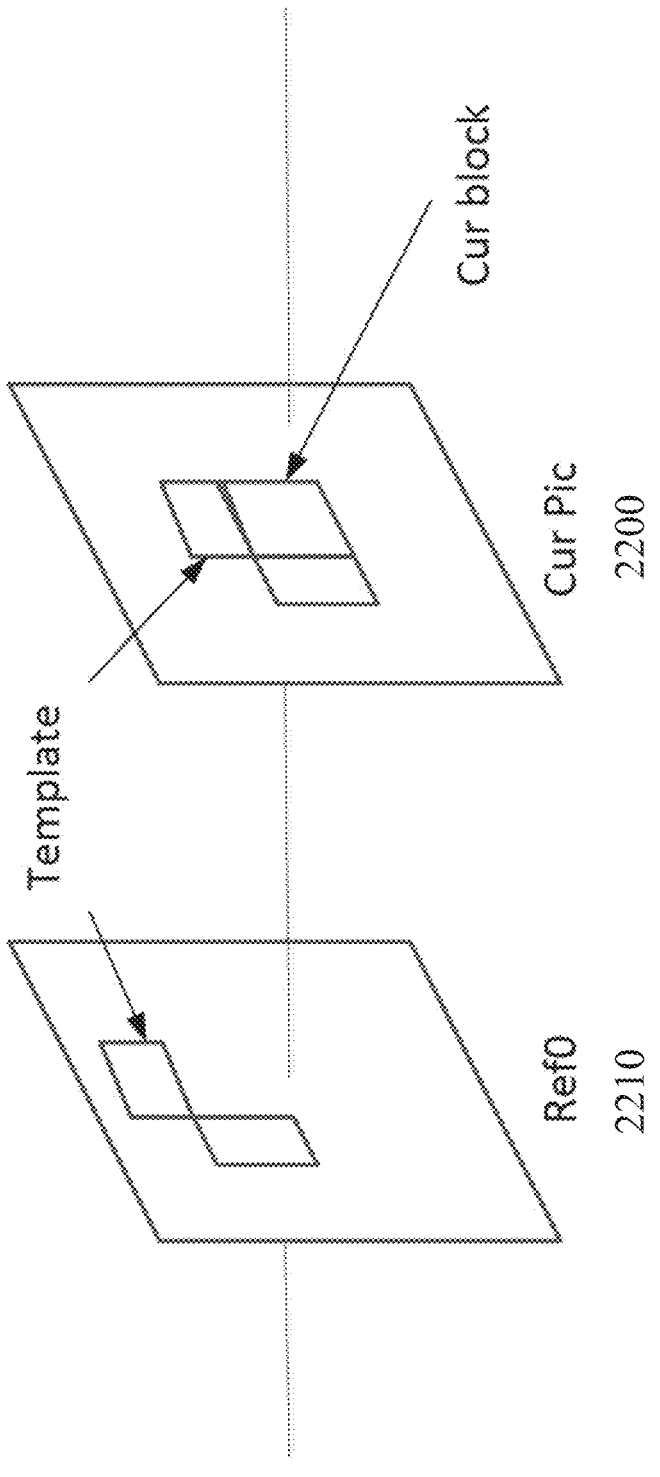
FIG. 22 shows an example of template matching in the FRUC algorithm.

FIG. 22 shows an example of template matching used in the Frame-Rate Up Conversion (FRUC) method. Template matching can be used to derive motion information of the current CU 2200 by finding the closest match between a template (e.g., top and/or left neighboring blocks of the current CU) in the current picture and a block (e.g., same size to the template) in a reference picture 2210. Except the aforementioned FRUC merge mode, the template matching can also be applied to AMVP mode. In both JEM and HEVC, AMVP has two candidates. With the template matching method, a new candidate can be derived. If the newly derived candidate by template matching is different to the first existing AMVP candidate, it is inserted at the very beginning of the AMVP candidate list and then the list size is set to two (e.g., by removing the second existing AMVP candidate). When applied to AMVP mode, only CU level search is applied.

The MV candidate set at CU level can include the following: (1) original AMVP candidates if the current CU is in AMVP mode, (2) all merge candidates, (3) several MVs in the interpolated MV field (described later), and top and left neighboring motion vectors.

When using bilateral matching, each valid MV of a merge candidate can be used as an input to generate a MV pair with the assumption of bilateral matching. For example, one valid MV of a merge candidate is (MVa, ref$_a$) at reference list A. Then the reference picture ref$_b$ of its paired bilateral MV is found in the other reference list B so that ref$_a$ and ref$_b$ are temporally at different sides of the current picture. If such a ref$_b$ is not available in reference list B, ref$_b$ is determined as a reference which is different from ref$_a$ and its temporal distance to the current picture is the minimal one in list B. After ref$_b$ is determined, MVb is derived by scaling MVa based on the temporal distance between the current picture and ref$_a$, ref$_b$.

In some implementations, four MVs from the interpolated MV field can also be added to the CU level candidate list. More specifically, the interpolated MVs at the position (0, 0), (W/2, 0), (0, H/2) and (W/2, H/2) of the current CU are added. When FRUC is applied in AMVP mode, the original AMVP candidates are also added to CU level MV candidate set. In some implementations, at the CU level, 15 MVs for AMVP CUs and 13 MVs for merge CUs can be added to the candidate list.

The MV candidate set at sub-CU level includes an MV determined from a CU-level search, (2) top, left, top-left and top-right neighboring MVs, (3) scaled versions of collocated MVs from reference pictures, (4) one or more ATMVP candidates (e.g., up to four), and (5) one or more STMVP candidates (e.g., up to four). The scaled MVs from reference pictures are derived as follows. The reference pictures in both lists are traversed. The MVs at a collocated position of the sub-CU in a reference picture are scaled to the reference of the starting CU-level MV. ATMVP and STMVP candidates can be the four first ones. At the sub-CU level, one or more MVs (e.g., up to 17) are added to the candidate list.

Generation of an interpolated MV field. Before coding a frame, interpolated motion field is generated for the whole picture based on unilateral ME. Then the motion field may be used later as CU level or sub-CU level MV candidates.

Figure 23:
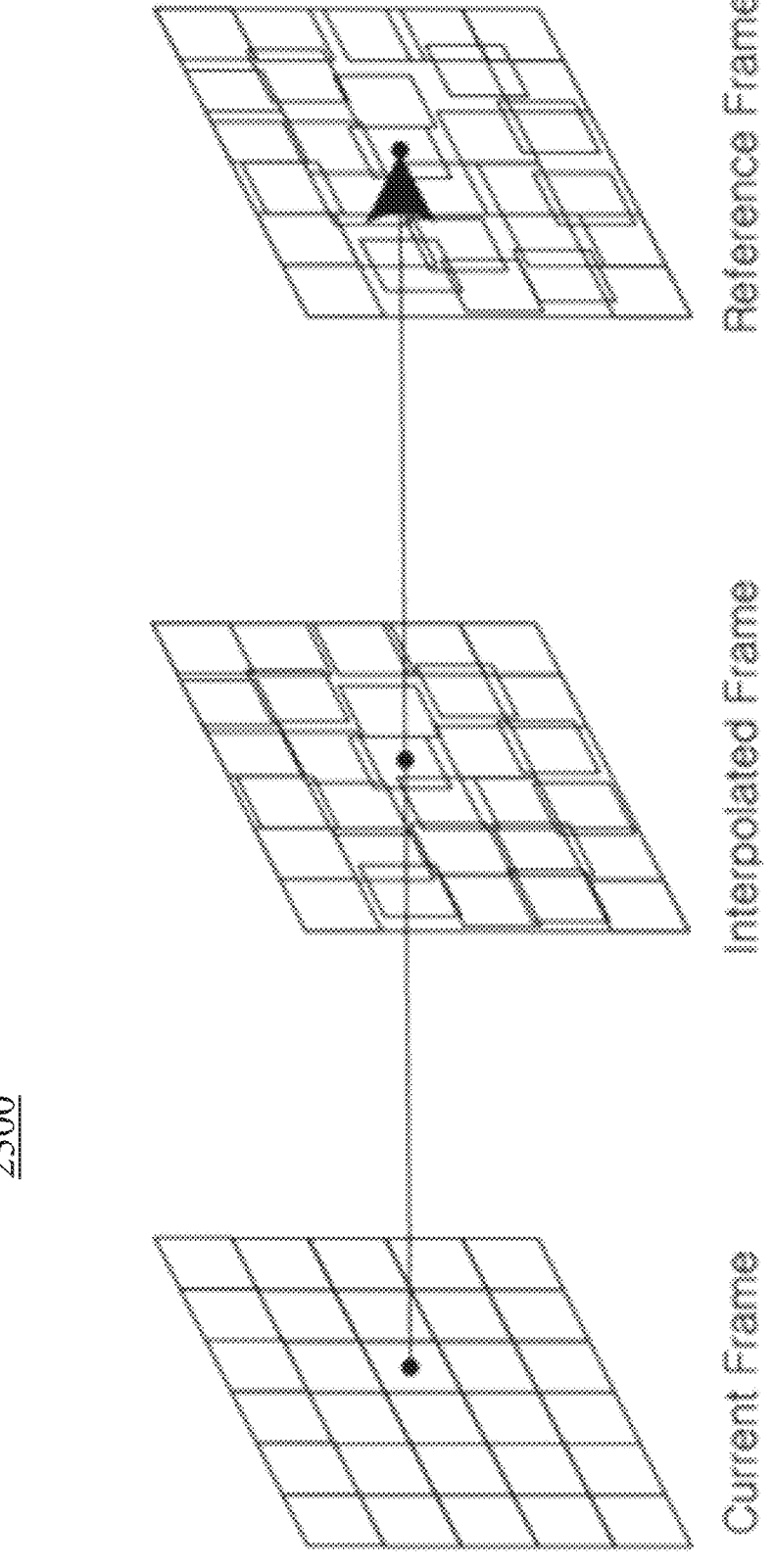
FIG. 23 shows an example of unilateral motion estimation in the FRUC algorithm.

In some embodiments, the motion field of each reference pictures in both reference lists is traversed at 4×4 block level. FIG. 23 shows an example of unilateral Motion Estimation (ME) 2300 in the FRUC method. For each 4×4 block, if the motion associated to the block passing through a 4×4 block in the current picture and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

Interpolation and matching cost. When a motion vector points to a fractional sample position, motion compensated interpolation is needed. To reduce complexity, bi-linear interpolation instead of regular 8-tap HEVC interpolation can be used for both bilateral matching and template matching.

The calculation of matching cost is a bit different at different steps. When selecting the candidate from the candidate set at the CU level, the matching cost can be the absolute sum difference (SAD) of bilateral matching or template matching. After the starting MV is determined, the matching cost C of bilateral matching at sub-CU level search is calculated as follows:

$$C = SAD + w \cdot \left( \left| MV_x - MV_x^s \right| + \left| MV_y - MV_y^s \right| \right) \qquad \text{Eq. (2)}$$

Here, w is a weighting factor. In some embodiments, w can be empirically set to 4. MV and $MV^s$ indicate the current MV and the starting MV, respectively. SAD may still be used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

In the bilateral matching merge mode, bi-prediction is applied because the motion information of a CU is derived based on the closest match between two blocks along the motion trajectory of the current CU in two different reference pictures. In the template matching merge mode, the encoder can choose among uni-prediction from list0, uni-prediction from list1, or bi-prediction for a CU. The selection ca be based on a template matching cost as follows:

```
If costBi <= factor * min (cost0, cost1)
    bi-prediction is used;
Otherwise, if cost0 <= cost1
    uni-prediction from list0 is used;
Otherwise,
    uni-prediction from list1 is used;
```

Here, cost0 is the SAD of list0 template matching, cost1 is the SAD of list1 template matching and costBi is the SAD of bi-prediction template matching. For example, when the value of factor is equal to 1.25, it means that the selection process is biased toward bi-prediction. The inter prediction direction selection can be applied to the CU-level template matching process.

3.4 Examples of Decoder-Side Motion Vector Refinement (DMVR)

In a bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 24:
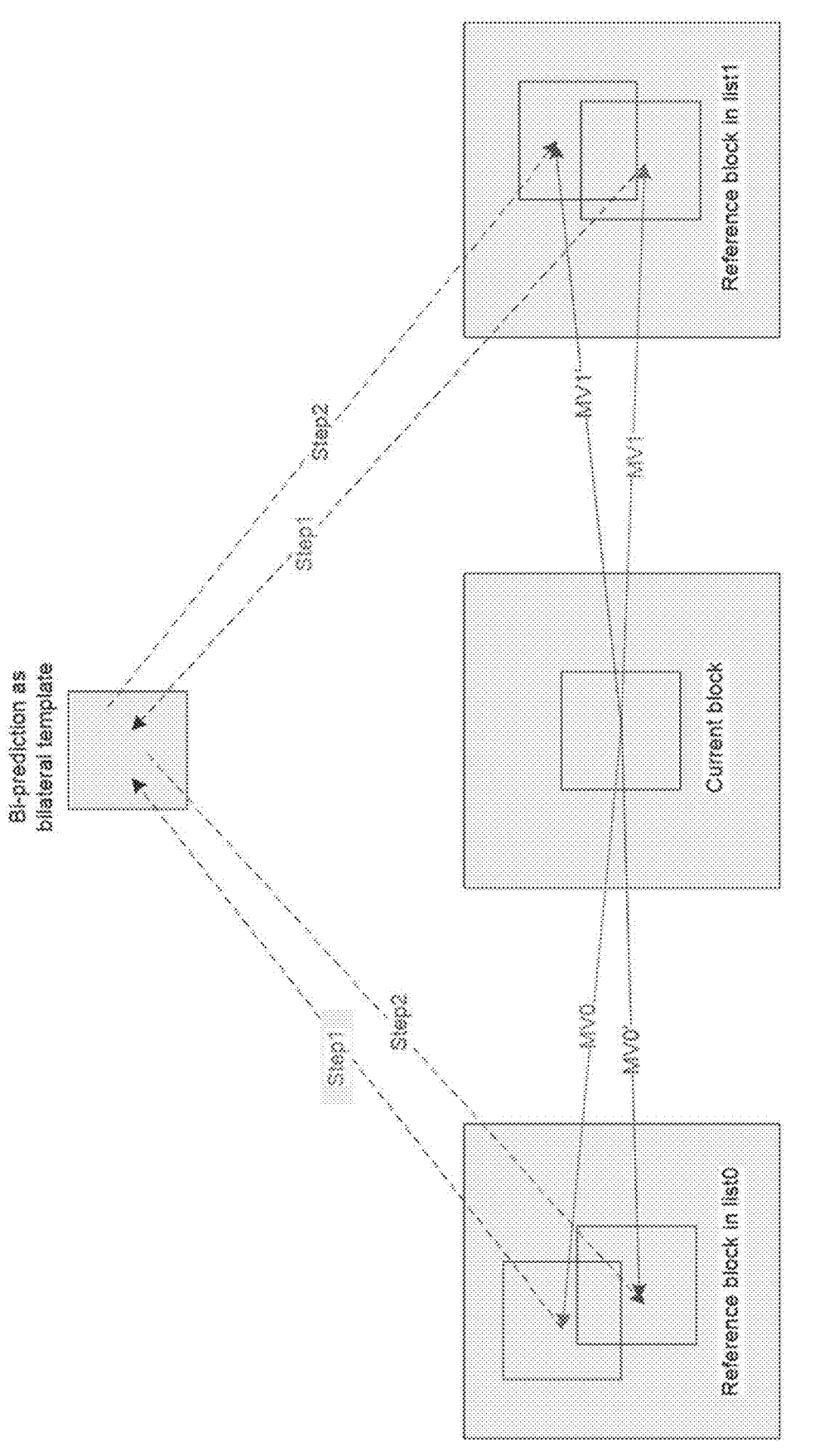
FIG. 24 shows an example of the decoder-side motion vector refinement (DMVR) algorithm based on bilateral template matching.

In DMVR, a bilateral template is generated as the weighted combination (i.e. average) of the two prediction blocks, from the initial MV0 of list0 and MV1 of list1, respectively, as shown in FIG. 24. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 24, are used for generating the final bi-prediction results. A sum of absolute differences (SAD) is used as the cost measure.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

3.5 Examples of Merge/Skip Mode with Bilateral Matching Refinement

Figure 25:
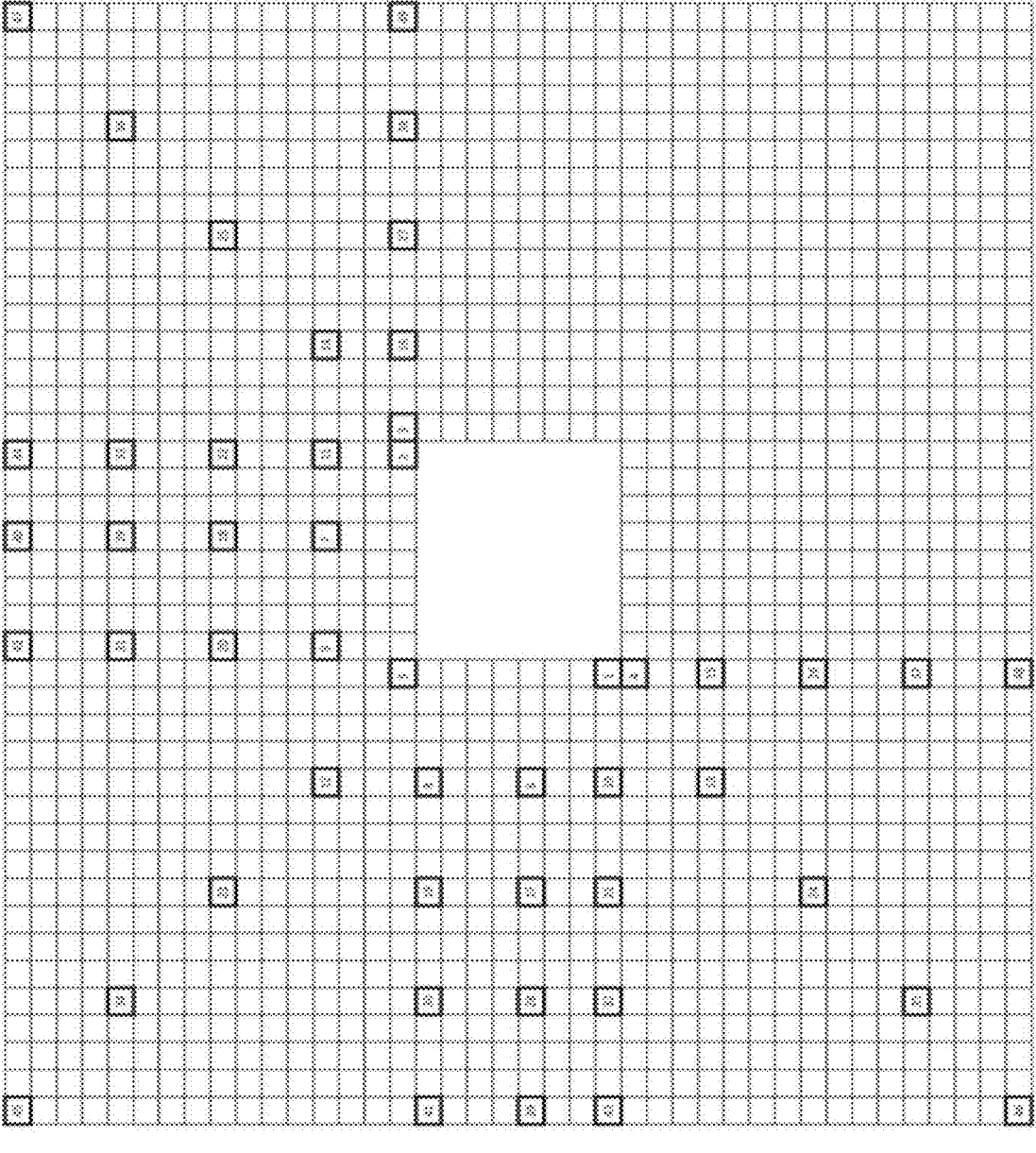
FIG. 25 shows an example of spatial neighboring blocks used to derive the spatial merge candidates.

A merge candidate list is first constructed by inserting the motion vectors and reference indices of the spatial neighboring and temporal neighboring blocks into the candidate list with redundancy checking until the number of the available candidates reaches the maximum candidate size of 19. The merge candidate list for the merge/skip mode is constructed by inserting spatial candidates, temporal candidates, affine candidates, advanced temporal MVP (ATMVP) candidate, spatial temporal MVP (STMVP) candidate and the additional candidates as used in HEVC (Combined candidates and Zero candidates) according to a pre-defined insertion order, and in the context of the numbered blocks shown in FIG. 25:

(1) Spatial candidates for blocks 1-4
(2) Extrapolated affine candidates for blocks 1-4
(3) ATMVP
(4) STMVP
(5) Virtual affine candidate
(6) Spatial candidate (block 5) (used only when the number of the available candidates is smaller than 6)
(7) Extrapolated affine candidate (block 5)
(8) Temporal candidate (derived as in HEVC)
(9) Non-adjacent spatial candidate followed by extrapolated affine candidate (blocks 6 to 49)
(10) Combined candidates
(11) Zero candidates It may be noted that IC flags are also inherited from merge candidates except for STMVP and affine. Moreover, for the first four spatial candidates, the bi-prediction ones are inserted before the ones with uni-prediction.

3.5.1 Non-Adjacent Merge Candidates

Non-adjacent merge candidates may be added to the merge candidate list if the total number of available merge candidates hasn't reached the maximumly allowed merge candidates. In an existing implementation, non-adjacent merge candidates may be inserted to the merge candidate list after the TMVP merge candidate. The process of adding non-adjacent merge candidates could be performed by the pseudocode shown in FIG. 26.

4. Examples of Existing Implementations

In existing implementations, using non-adjacent merge candidates which obtain motion information from non-adjacent blocks may result in suboptimal performance.

In one example, prediction from motion information of non-adjacent blocks located above CTU rows may significantly increase the line buffer size.

In another example, prediction from motion information of non-adjacent blocks could bring additional coding gain with the cost of storing all the motion information (typically on 4×4 level) into cache which significantly increase the complexity for hardware implementation.

5. Example Methods for Constructing Non-Adjacent Merge Candidates

Embodiments of the presently disclosed technology overcome the drawbacks of existing implementations, thereby providing video coding with lower memory and complexity requirements and higher coding efficiencies. The selection of non-adjacent merge candidates based on the disclosed technology, which may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

Embodiments of the disclosed technology reduce the cache/line buffer size required by the non-adjacent merge candidate as well as methods for further improving the coding performance of non-adjacent merge candidates.

For the examples discussed below, let the top-left sample coordinate of the current block be (Cx, Cy) and the coordinate of the top-left sample in one non-adjacent block by (NAx, NAy), with the origin (0,0) to be the top-left point of a picture/slice/tile/LCU row/LCU. The coordinate difference (i.e., offset from the current block) is denoted by (offsetX, offsetY) wherein offsetX=Cx−NAx and offsetY=Cy−NAy.

Examples 1 and 2 advantageously provide, at least, memory and buffer reductions.

Example 1. In one example, only non-adjacent blocks located at certain positions are accessed when constructing merge candidates.

(a) In one example, x and y should satisfy that NAx % M=0 and NAy % N=0 wherein M and N are two non-zero integers, such as M=N=8 or 16.

(b) In one example, if the top-left sample in one non-adjacent block doesn't satisfy the given conditions, the checking of the motion information associated with this block is skipped. Therefore, the associated motion information couldn't be added to the merge candidate list.

(c) Alternatively, if the top-left sample in one non-adjacent block doesn't satisfy the given conditions, the position of this block may be shifted, truncated or rounded to make sure the conditions are satisfied. For example, (NAx, NAy) may be modified to ((NAx/M) *M, (NAy/N)*N) wherein '/' is the integer division.

(d) The restricted region size covering all the non-adjacent blocks may be pre-defined/signaled. In this case, when a non-adjacent block calculated by a given offset (OffsetX, OffsetY) is outside the region, it is marked as unavailable or treated as intra-code mode. The corresponding motion information could be added a candidate to the candidate list. An example is depicted in FIG. 27.

(i) In one example, the region size is defined as one or more CTBs.

(ii) Alternatively, all blocks above the LCU row covering the current block are marked as unavailable or treated as intra-code mode. The corresponding motion information could be added a candidate to the candidate list.

(iii) Alternatively, suppose the top-left sample coordinate of the LCU covering current block by (LX, LY). (LX-NAx) and/or abs(LX-NAx) and/or (LY-NAy) and/or abs(LY-NAy) should be within a threshold.

(iv) One or multiple thresholds may be predefined. They could be further dependent on minimum size of CU height/minimum size of width/LCU size etc., al. For example, (LY-NAy) should be less than the minimum size of CU height, or (LY-NAy) should be less than twice of the minimum size of CU height.

(v) The region size or the threshold(s) may be signaled in a Sequence Parameter Set (SPS), a Picture Parameter Set (PPS), a Video Parameter Set (VPS), a slice header, a tile header, and so on.

(vi) In one example, all non-adjacent blocks outside the current slice/tile/other kinds of unit for parallel coding are marked as unavailable, and the corresponding motion information should not be added as a candidate to the candidate list.

Example 2. Spatial motion compression may be applied after coding/decoding one region (e.g., CTU, multiple CTUs).

(a) When motion compression is applied to a region, it means that all blocks within the region are forced to share one representative set of motion information.

(b) After coding/decoding a region, spatial motion compression may be applied.

(c) Alternatively, furthermore, the representative set of motion information is utilized to predict the following blocks.

(d) Alternatively, furthermore, the spatial motion compression is applied before filtering process, e.g., deblocking filtering, Sample Adaptive Offset (SAO) filtering.

(e) Alternatively, furthermore, the compressed motion information are used in the filtering process.

(f) In one example, the set of motion information from a certain (e.g., the center or bottom-right) position of the region is selected as the representative set.

(g) Alternatively, multiple positions may be checked in order, once an inter-coded block for a position is identified, the checking process terminates and the associated motion information is used as the representative set.

(h) In one example, a set of motion information may be derived from the motion information associated with the region and used as the representative set.

Example 3 advantageously provides, at least, reduction in computational complexity.

Example 3. When inserting a new non-adjacent merge candidate, pruning may be applied to partial of available merge candidates.

(a) In one example, the new non-adjacent merge candidate is not pruned to other inserted non-adjacent merge candidates.

(b) In one example, the new non-adjacent merge candidate is not pruned to the temporal merge candidate, such as TMVP or ATMVP.

(c) In one example, the new non-adjacent merge candidate is pruned with some merge candidates from some specific neighboring blocks, but not pruned with some other merge candidates from some other specific neighboring blocks.

Examples 4-7 advantageously provide, at least, coding performance gains.

Example 4. Not all kinds of motion information of non-adjacent blocks are considered in the merge candidate list.

(a) In one example, only motion information of AMVP-coded non-adjacent blocks are considered.

(b) In one example, only motion information of merge-coded non-adjacent blocks are considered.

(c) In one example, only motion information of merge-coded non-adjacent blocks and not from a spatial merge candidate are considered.

(d) In one example, only motion information of merge-coded non-adjacent blocks with motion refinement process invoked are considered.

(e) In one example, motion information of non-adjacent blocks coded with any kind of decoder side MV refinement, such as FRUC, template-matching, or pattern matched motion vector refinement (PMVR), are not considered.

(f) In one example, motion information with low MVD/MV precision, like 4-pel precision, are not considered.

Example 5. For the non-adjacent spatial neighbors, those coded with a first mode are given higher priority compared to those coded with a second mode (e.g., checked before all the non-adjacent spatial neighbors coded with the second mode).

(a) Alternatively, for each distance, non-adjacent spatial neighbors coded with the first modes are given higher priority compared to those coded with the second mode. While for different distances, non-adjacent spatial neighbors with smaller distance are given higher priority.

(b) In one example, the first mode is defined as the AMVP mode, and the second mode is defined as the merge mode, and vice versa.

(c) Alternatively, the first mode is defined as the bi-prediction mode, and the second mode is defined as the uni-prediction mode, and vice versa.

(d) Alternatively, the first mode is defined as the AMVP mode, and the second mode is defined as the merge mode but not a spatial merge candidate.

(e) Alternatively, the first mode is defined as affine mode, and the second is defined as non-affine mode, or vice versa.

(f) Alternatively, the first mode is defined as high MV precision mode, and the second mode is defined as low MV precision mode.

Example 6. Instead of checking non-adjacent spatial neighbors after a certain kind of merge candidate (e.g., TMVP), multiple stages of non-adjacent merge candidates may be derived and added to merge candidate list.

(a) In one example, for the first stage, those non-adjacent spatial neighbors coded with a first mode may be added after the first given kind of merge candidate. While for the second stage, those non-adjacent spatial neighbors coded with a second mode may be added after the second given kind of merge candidate, and so on.

(b) In one example, the first given kind of merge candidate may be the last spatial merge candidate while the second given kind of merge candidate may be the TMVP merge candidate.

(c) Alternatively, furthermore, the multiple stages may involve different positions of non-adjacent blocks.

(d) The first and second modes may be defined as in Example 5.

Example 7. The motion information of non-adjacent blocks may be used a predictor in the AMVP mode.

(a) In one example, one or multiple MV candidates derived (e.g., scaling to the target reference picture)/inherited from one or multiple non-adjacent blocks may be added to the AMVP candidate list.

(b) Alternatively, one or multiple motion candidates inherited from one or multiple non-adjacent blocks may be added to the AMVP candidate list. In this case, the signaling of reference picture index as well as prediction directions are skipped, and they are inherited from the motion candidate.

(c) The usage of motion information associated with non-adjacent blocks may be applied under certain conditions, e.g., the total number of AMVP candidates doesn't reach the maximumly allowed size, and/or when the indication of the usage is signaled, and/or the block size (W, H) where W>th0 and H>th1 (th0 and th1 are two thresholds, e.g., both equal to 8).

FIG. 28 shows a flowchart of an exemplary method for video coding, which may be implemented in a video encoder. The method 2800 includes, at step 2810, receiving a current block of video data. The method 2800 includes, at step 2820, selecting, based on a rule, a first non-adjacent block that is not adjacent to the current block. The method 2800 includes, at step 2830, constructing a first merge candidate comprising motion information based on the first non-adjacent block. The method 2800 includes, at step 2840, identifying a second non-adjacent block that is not adjacent to the current block and different from the first non-adjacent block. The method 2800 includes, at step 2850, based on determining that the second non-adjacent block fails to satisfy the rule, refraining adding a second merge candidate derived from the second non-adjacent block. The method 2800 includes, at step 2860, constructing a merge candidate list based on the first non-adjacent block. The method 2800 includes, at step 2870, decoding the current block based on the motion information.

FIG. 29 shows a flowchart of another example method for video coding in accordance with the presently disclosed technology. The method 2900 includes, at step 2910, receiving a current block of video data. The method 2900 includes, at step 2920, selecting, based on a rule, a first non-adjacent block that is not adjacent to the current block. The method 2900 includes, at step 2930, constructing a first merge candidate comprising motion information based on the first non-adjacent block. The method 2900 includes, at step 2940, selecting a second non-adjacent block, wherein the first non-adjacent block and the second non-adjacent block are not adjacent to the current block, wherein the first non-adjacent block is coded with a first mode, wherein the second non-adjacent block is coded with a second mode, and wherein the first non-adjacent block is selected prior to selecting the second non-adjacent block. The method 2900 includes, at step 2950, constructing a second merge candidate comprising motion information based on the second non-adjacent block.

FIG. 30 shows a flowchart of yet another example method for video coding in accordance with the presently disclosed technology. The method 3000 includes, at step 3010, receiving a current block of video data. The method 3000 includes, at step 3020, selecting, based on rules, a first subset of non-adjacent blocks and a second subset of non-adjacent blocks that are not adjacent to the current block. The method 3000 includes, at step 3030, constructing a first subset of merge candidates comprising motion information based on the first subset of non-adjacent blocks and a second subset of merge candidates comprising motion information based on the second subset of non-adjacent blocks, wherein the first subset of merge candidates is added into a merge candidate list after a merge candidate of a first type, and wherein the second subset of merge candidates is added into the merge candidate list after a merge candidate of a second type.

FIG. 31 shows a flowchart of a further example method for video coding in accordance with the presently disclosed technology. The method 3100 includes, at step 3110, receiving a current block of video data. The method includes, at step 3120, selecting, based on a rule, a first non-adjacent block that is not adjacent to the current block. The method includes, at step 3130, Constructing at least one motion vector predictor candidate based on the first non-adjacent block, wherein the at least one motion vector predictor candidate is used as a predictor in an advanced motion vector prediction (AMVP) mode. The method includes, at step 3140, decoding a block associated with the AMVP mode based on the at least one motion vector predictor candidate.

Some features preferred by some embodiments are provided in clause-based format as follows. These embodiments include further variations and aspect of techniques described in Examples 4 to 7.

1. A method for video processing (e.g., method 2800), comprising: receiving a current block of video data; selecting, based on a rule, a first non-adjacent block that is not adjacent to the current block; constructing a first merge candidate comprising motion information based on the first non-adjacent block; identifying a second non-adjacent block that is not adjacent to the current block and different from the first non-adjacent block; based on determining that the second non-adjacent block fails to satisfy the rule, refraining adding a second merge candidate derived from the second non-adjacent block; constructing a merge candidate list based on the first non-adjacent block; and decoding the current block based on the merge candidate list.

2. The method of clause 1, wherein the rule indicates a coding characteristic of the first non-adjacent block and the second non-adjacent block.

3. The method of clause 2, wherein the rule indicates that the first non-adjacent block is an advanced motion vector prediction (AMVP)-coded non-adjacent block.

4. The method of clause 2, wherein the rule indicates that the first non-adjacent block is a merge-coded non-adjacent block.

5. The method of clause 4, wherein the rule indicates that the first non-adjacent block is not coded with a spatial merge candidate.

6. The method of clause 4, wherein the rule indicates that the first non-adjacent block is coded with a motion refinement process.

7. The method of clause 2, wherein the rule indicates that the first non-adjacent is not coded with decoder-side motion vector refinement (DMVR).

8. The method of clause 2, wherein the rule indicates that the first non-adjacent block is coded with a type of motion information that excludes motion information with low precision motion vectors or motion vector differences.

9. A method for video processing (e.g., method 2900), comprising: receiving a current block of video data; selecting, based on a rule, a first non-adjacent block that is not adjacent to the current block; constructing a first merge candidate comprising motion information based on the first non-adjacent block; selecting a second non-adjacent block, wherein the first non-adjacent block and the second non-adjacent block are not adjacent to the current block, wherein the first non-adjacent block is coded with a first mode, and the second non-adjacent block is coded with a second mode, and wherein the first non-adjacent block is selected prior to selecting the second non-adjacent block; and constructing a second merge candidate comprising motion information based on the second non-adjacent block.

10. The method of clause 9, further comprising: constructing a merge candidate list based on the first merge candidate and the second merge candidate.

11. The method of any one or more of clauses 10, wherein the second merge candidate is added to the merge candidate list after the first merge candidate.

12. The method of clause 9, wherein the first mode is an advanced motion vector prediction (AMVP) mode and the second mode is a merge mode, or vice versa.

13. The method of clause 12, wherein the merge mode is associated with a merge index which does not correspond to a spatial merge candidate.

14. The method of clause 9, wherein the first mode is a bi-prediction mode and the second mode is a uni-prediction mode, or vice versa.

15. The method of clause 9, wherein the first mode is an affine mode and the second mode is a non-affine mode, or vice versa.

16. The method of clause 9, wherein the first mode is a high motion vector (MV) precision mode and the second mode is a low MV precision mode.

17. A method for video processing (e.g., method 3000), comprising: receiving a current block of video data; selecting, based on rules, a first subset of non-adjacent blocks and a second subset of non-adjacent blocks that are not adjacent to the current block; and constructing a first subset of merge candidates comprising motion information based on the first subset of non-adjacent blocks and a second subset of merge candidates comprising motion information based on the second subset of non-adjacent blocks, wherein the first subset of merge candidates is added into a merge candidate list after a merge candidate of a first type, and wherein the second subset of merge candidates is added into the merge candidate list after a merge candidate of a second type.

18. The method of clause 17, wherein the first subset of non-adjacent blocks are coded with a first mode and the second subset of non-adjacent blocks are coded with a second mode.

19. The method of any one or more of clauses 17-18, wherein the merge candidate of the first type is a TMVP merge candidate.

20. The method of any one or more of clauses 17-18, wherein the merge candidate of the first type is a last spatial merge candidate, and wherein the merge candidate of the second type is a TMVP merge candidate.

21. The method of any one or more of clauses 17-18, wherein the first non-adjacent block and the second non-adjacent block are located at different spatial positions with respect to the current block.

22. The method of clause 18, wherein the first mode is an advanced motion vector prediction (AMVP) mode and the second mode is a merge mode, or vice versa.

23. The method of clause 22, wherein the merge mode is associated with a merge index which does not correspond to a spatial merge candidate.

24. The method of clause 18, wherein the first mode is a bi-prediction mode and the second mode is a uni-prediction mode, or vice versa.

25. The method of clause 18, wherein the first mode is an affine mode and the second mode is a non-affine mode, or vice versa.

26. The method of clause 18, wherein the first mode is a high motion vector (MV) precision mode and the second mode is a low MV precision mode.

27. The method of any one or more of clauses 17-18, wherein the merge candidate of the first type and the merge candidate of the second type are same.

28. A method for video processing (e.g., method 3100), comprising: receiving a current block of video data; selecting, based on a rule, a first non-adjacent block that is not adjacent to the current block; constructing at least one motion vector predictor candidate based on the first non-adjacent block, wherein the at least one motion vector predictor candidate is used as a predictor in an advanced motion vector prediction (AMVP) mode; and decoding a block associated with the AMVP mode based on the at least one motion vector predictor candidate.

29. The method of clause 28, wherein the constructing the first motion vector predictor candidate comprises: scaling motion information of the first non-adjacent block to a reference picture for generating scaled motion information; and constructing an AMVP candidate list using the scaled motion information of the first non-adjacent block.

30. The method of clause 29, wherein signaling of a reference picture index or a prediction direction for the current block is skipped.

31. The method of any one or more of clauses 28-30, wherein usage of the motion information from the first non-adjacent block or the second non-adjacent block is based on one or more of (a) an upper limit on a size of the AMVP candidate list, (b) dimensions of the current block of video data, and (c) an indication of usage of the motion information.

32. An apparatus in a video system comprising a processor and a non-transitory memory with instructions thereon, wherein the instructions upon execution by the processor, cause the processor to implement the method in any one of clauses 1 to 31.

33. A computer program product stored on a non-transitory computer readable media, the computer program product including program code for carrying out the method in any one of clauses 1 to 31.

The examples described above may be incorporated in the context of the methods described below, e.g., methods 2800, 2900, 3000, and 3100 which may be implemented at a video decoder and/or video encoder (e.g., a transcoder).

6. Example Implementations of the Disclosed Technology

Figure 32:
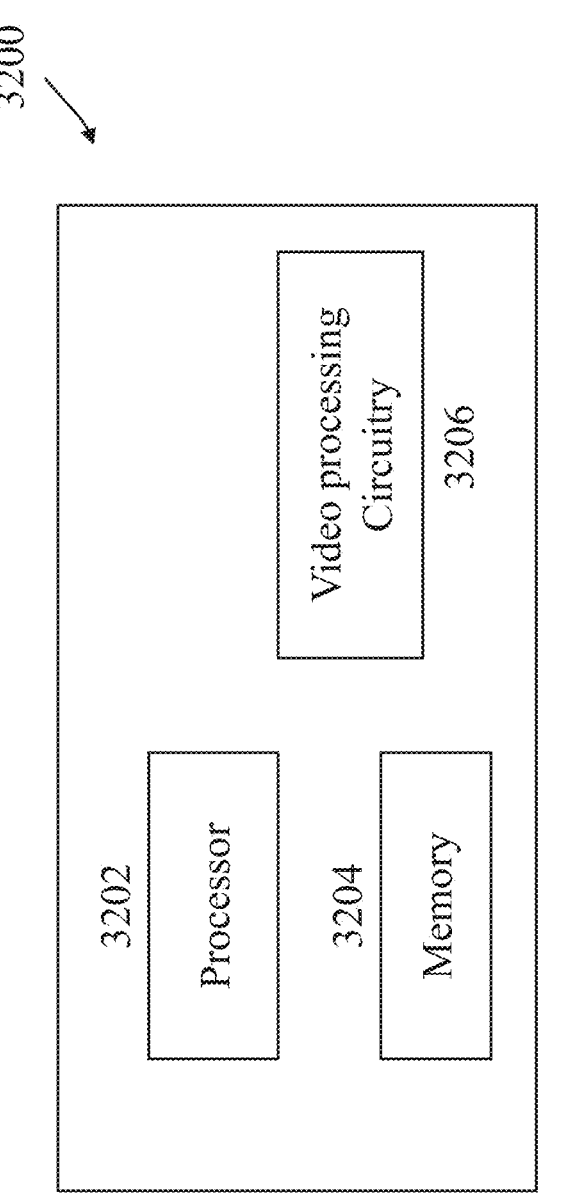
FIG. 32 is a block diagram of an example of a hardware platform for implementing a visual media decoding or a visual media encoding technique described in the present document.

FIG. 32 is a block diagram of a video processing apparatus 3200. The apparatus 3200 may be used to implement one or more of the methods described herein. The apparatus 3200 may be embodied in a smartphone, tablet, computer, Internet of Things (IoT) receiver, and so on. The apparatus 3200 may include one or more processors 3202, one or more memories 3204 and video processing hardware 3206. The processor(s) 3202 may be configured to implement one or more methods (including, but not limited to, methods 2800, 2900, 3000, and 3100) described in the present document. The memory (memories) 3204 may be used for storing data and code used for implementing the methods and techniques described herein. The video processing hardware 3206 may be used to implement, in hardware circuitry, some techniques described in the present document.

In some embodiments, a video decoder apparatus may implement a method of using zero-units as described herein is used for video decoding. The various features of the method may be similar to the above-described methods 2800, 2900, 3000, and 3100.

In some embodiments, the video decoding methods may be implemented using a decoding apparatus that is implemented on a hardware platform as described with respect to FIG. 32.

Based on the description above, one of ordinary skill in the art will appreciate that the following techniques and aspects are disclosed. In one representative aspect, the disclosed technology may be used to provide a method for video coding. This method includes receiving a current block of video data, selecting, based on a rule, a first non-adjacent block that is not adjacent to the current block, constructing a first merge candidate, comprising motion information, based on the first non-adjacent block, constructing a merge candidate list according to the first merge candidate and decoding the current block based on the merge candidate list. If the rule is not satisfied, the motion information of the first non-adjacent block is not taken into consideration in the merge candidate list construction process.

In another representative aspect, the disclosed technology may be used to provide another method for video coding. This method includes receiving a current block of video data, selecting, based on a rule, a first non-adjacent block that is not adjacent to the current block, constructing a first merge candidate, comprising motion information, based on the first non-adjacent block, and selecting a second non-adjacent block, wherein the first non-adjacent block and the second non-adjacent block are spatial neighbors of the current block, wherein the first non-adjacent block is coded with a first mode, wherein the second non-adjacent block is coded with a second mode, and wherein the first non-adjacent block is selected prior to selecting the second non-adjacent block.

In another representative aspect, the disclosed technology may be used to provide another method for video coding. This method includes receiving a current block of video data, selecting, based on a first rule, a first set of one or multiple non-adjacent blocks that are not adjacent to the current block, and constructing a first subset of one or multiple merge candidate, comprising motion information, based on the first set of non-adjacent blocks with the first rule satisfied, wherein a second subset of merge candidates, is constructed based on a first set of one or multiple non-adjacent blocks, satisfying a second rule, wherein the first subset of merge candidate is added into a merge candidate list after the second subset of merge candidates.

In another representative aspect, the disclosed technology may be used to provide another method for video coding. This method includes receiving a current block of video data, selecting, based on a first rule, a first set of one or multiple non-adjacent blocks that are not adjacent to the current block, and constructing a first subset of one or multiple merge candidate, comprising motion information, based on the first set of non-adjacent blocks with the first rule satisfied, wherein a second subset of merge candidates, is constructed based on a first set of one or multiple non-adjacent blocks, satisfying a second rule, wherein the first subset of merge candidate is added into a merge candidate list after the second subset of merge candidates.

In another representative aspect, the disclosed technology may be used to provide another method for video coding. This method includes receiving a current block of video data, selecting, a first set of one or multiple non-adjacent blocks that are not adjacent to the current block, and constructing a first subset of one or multiple merge candidate, comprising motion information, based on the first set of non-adjacent blocks, wherein the first subset of merge candidate is coded with the first rule satisfied, wherein a second subset of merge candidates, is constructed based on a first set of one or multiple non-adjacent blocks, wherein the first subset of merge candidate is added into a merge candidate list after one merge candidate with a first type, and the second subset of merge candidates is added into a merge candidate list after one merge candidate with a second type.

In another representative aspect, the disclosed technology may be used to provide another method for video coding. This method includes receiving a current block of video data, selecting, based on a rule, a first non-adjacent block that is not adjacent to the current block, and constructing a first merge candidate, comprising motion information, based on the first non-adjacent block, wherein the motion information of the first non-adjacent block is used as a predictor in an advanced motion vector prediction (AMVP) mode.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., erasable programmable read-only memory (EPROM), Electrically Erasable Programmable Read Only Memory (EEPROM), and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for video processing comprising:
   receiving a current block of video data during a conversion between the current block and a bitstream of a video;
   identifying a first non-adjacent block that is not adjacent to the current block, wherein the first non-adjacent block is coded with a first mode;
   identifying a second non-adjacent block that is not adjacent to the current block, wherein the second non-adjacent block is coded with a second mode;
   constructing a merge candidate list based on a rule; and
   performing the conversion based on the merge candidate list, wherein the rule specifies that the first non-adjacent block coded with the first mode is selected prior to selecting the second non-adjacent block coded with the second mode in constructing the merge candidate list,
   wherein the method further comprises:
   selecting a third non-adjacent block and a fourth non-adjacent block,
   wherein a first distance between the third non-adjacent block and the current block is smaller than a second distance between the fourth non-adjacent block and the current block, and
   wherein the rule specifies that the third non-adjacent block with the smaller distance is selected prior to selecting the fourth non-adjacent block.

2. The method of claim 1, further comprising:
   selecting a first subset of non-adjacent blocks and a second subset of non-adjacent blocks that are not adjacent to the current block, wherein the first subset of non-adjacent blocks is coded with a third mode and the second subset of non-adjacent blocks is coded with a fourth mode;
   constructing a first subset of merge candidates comprising motion information based on the first subset of non-adjacent blocks and a second subset of merge candidates comprising motion information based on the second subset of non-adjacent blocks; and
   inserting the first subset of merge candidates and the second subset of merge candidates into a merge candidate list based on a second rule,
   wherein the second rule specifies that the first subset of merge candidates is added into a merge candidate list after a merge candidate of a first type, and wherein the second subset of merge candidates is added into the merge candidate list after a merge candidate of a second type.

3. The method of claim 2, wherein the merge candidate of the first type is a last spatial merge candidate, and wherein the merge candidate of the second type is a temporal motion vector prediction (TMVP) merge candidate.

4. The method of claim 1, further comprising:
   identifying a fifth non-adjacent block that is not adjacent to the current block; and
   constructing at least one motion vector predictor candidate based on the fifth non-adjacent block,
   wherein the rule specifies that the at least one motion vector predictor candidate is used as a predictor in an advanced motion vector prediction (AMVP) mode.

5. The method of claim 4, wherein the constructing the at least one motion vector predictor candidate comprises:
   scaling motion information of the fifth non-adjacent block to a reference picture for generating scaled motion information; and
   constructing an AMVP candidate list using the scaled motion information of the fifth non-adjacent block.

6. The method of claim 4, wherein the rule specifies that a usage of the motion information from the fifth non-adjacent block is based on at least one of: (a) an upper limit on a size of an AMVP candidate list, (b) dimensions of the current block of video data, and (c) an indication of usage of the motion information.

7. The method of claim 1, wherein the conversion includes encoding the video into the bitstream.

8. The method of claim 1, wherein the conversion includes decoding the video from the bitstream.

9. An apparatus in a video system comprising a processor and a non-transitory memory with instructions thereon, wherein the instructions upon execution by the processor, cause the processor to:

receive a current block of video data, during a conversion between the current block and a bitstream of a video;

identify a first non-adjacent block that is not adjacent to the current block, wherein the first non-adjacent block is coded with a first mode;

identify a second non-adjacent block that is not adjacent to the current block, wherein the second non-adjacent block is coded with a second mode;

construct a merge candidate list based on a rule; and perform the conversion based on the merge candidate list, wherein the rule specifies that the first non-adjacent block coded with the first mode is selected prior to selecting the second non-adjacent block coded with the second mode in constructing the merge candidate list, wherein the processor is further caused to: select a third non-adjacent block and a fourth non-adjacent block, wherein a first distance between the third non-adjacent block and the current block is smaller than a second distance between the fourth non-adjacent block and the current block, and wherein the rule specifies that the third non-adjacent block with the smaller distance is selected prior to selecting the fourth non-adjacent block.

10. The apparatus of claim 9, wherein the first mode is an AMVP mode and the second mode is a merge mode, or the first mode is the merge mode and the second mode is the AMVP mode; or the first mode is a bi-prediction mode and the second mode is a uni-prediction mode, or the first mode is the uni-prediction mode and the second mode is the bi-prediction mode; or the first mode is an affine mode, and the second mode is a non-affine mode, or the first mode is the non-affine mode, and the second mode is the affine mode; or the first mode is a first MV precision mode, and the second mode is a second MV precision mode.

11. The apparatus of claim 9, wherein the processor is further caused to:

select a first subset of non-adjacent blocks and a second subset of non-adjacent blocks that are not adjacent to the current block, wherein the first subset of non-adjacent blocks is coded with a third mode and the second subset of non-adjacent blocks is coded with a fourth mode;

construct a first subset of merge candidates comprising motion information based on the first subset of non-adjacent blocks and a second subset of merge candidates comprising motion information based on the second subset of non-adjacent blocks; and insert the first subset of merge candidates and the second subset of merge candidates into a merge candidate list based on a second rule, wherein the second rule specifies that the first subset of merge candidates is added into a merge candidate list after a merge candidate of a first type, and wherein the second subset of merge candidates is added into the merge candidate list after a merge candidate of a second type;

wherein the merge candidate of the first type is a last spatial merge candidate, and wherein the merge candidate of the second type is a temporal motion vector prediction (TMVP) merge candidate.

12. The apparatus of claim 9, wherein the processor is further caused to:

identify a fifth non-adjacent block that is not adjacent to the current block; and construct at least one motion vector predictor candidate based on the fifth non-adjacent block, wherein the rule specifies that the at least one motion vector predictor candidate is used as a predictor in an advanced motion vector prediction (AMVP) mode.

13. The apparatus of claim 12, wherein the construction of the at least one motion vector predictor candidate comprises:

scaling motion information of the fifth non-adjacent block to a reference picture for generating scaled motion information; and constructing an AMVP candidate list using the scaled motion information of the fifth non-adjacent block, wherein the rule specifies that a usage of the motion information from the fifth non-adjacent block is based on at least one of: (a) an upper limit on a size of the AMVP candidate list, (b) dimensions of the current block of video data, and (c) an indication of usage of the motion information.

14. A method for storing a bitstream of a video comprising:

receiving a current block of the video;

identifying a first non-adjacent block that is not adjacent to the current block, wherein the first non-adjacent block is coded with a first mode;

identifying a second non-adjacent block that is not adjacent to the current block, wherein the second non-adjacent block is coded with a second mode;

constructing a merge candidate list based on a rule; and generating the bitstream based on the merge candidate list, storing the bitstream in a non-transitory computer-readable recording medium, wherein the rule specifies that the first non-adjacent block coded with the first mode is selected prior to selecting the second non-adjacent block coded with the second mode in constructing the merge candidate list, the method further comprises: selecting a third non-adjacent block and a fourth non-adjacent block, wherein a first distance between the third non-adjacent block and the current block is smaller than a second distance between the fourth non-adjacent block and the current block, and wherein the rule specifies that the third non-adjacent block with the smaller distance is selected prior to selecting the fourth non-adjacent block.

15. The method of claim 14, wherein the first mode is an AMVP mode and the second mode is a merge mode, or the first mode is the merge mode and the second mode is the AMVP mode; or the first mode is a bi-prediction mode and the second mode is a uni-prediction mode, or the first mode is the uni-prediction mode and the second mode is the bi-prediction mode; or the first mode is an affine mode, and the second mode is a non-affine mode, or the first mode is the non-affine mode, and the second mode is the affine mode; or the first mode is a first MV precision mode, and the second mode is a second MV precision mode.

16. The method of claim 14, further comprising:

selecting a first subset of non-adjacent blocks and a second subset of non-adjacent blocks that are not adjacent to the current block, wherein the first subset of non-adjacent blocks is coded with a third mode and the second subset of non-adjacent blocks is coded with a fourth mode;

constructing a first subset of merge candidates comprising motion information based on the first subset of non-adjacent blocks and a second subset of merge candidates comprising motion information based on the second subset of non-adjacent blocks; and inserting the first subset of merge candidates and the second subset of merge candidates into a merge candidate list based on a second rule, wherein the second rule specifies that the first subset of merge candidates is added into a merge candidate list after a merge candidate of a first type, and wherein the second subset of merge candidates is added into the merge candidate list after a merge candidate of a second type;

wherein the merge candidate of the first type is a last spatial merge candidate, and wherein the merge candidate of the second type is a temporal motion vector prediction (TMVP) merge candidate.

17. The method of claim 14, further comprising:

identifying a fifth non-adjacent block that is not adjacent to the current block; and constructing at least one motion vector predictor candidate based on the fifth non-adjacent block, wherein the rule specifies that the at least one motion vector predictor candidate is used as a predictor in an advanced motion vector prediction (AMVP) mode.

18. The method of claim 17, wherein the construction of the at least one motion vector predictor candidate comprises:

scaling motion information of the fifth non-adjacent block to a reference picture for generating scaled motion information; and constructing an AMVP candidate list using the scaled motion information of the fifth non-adjacent block, wherein the rule specifies that a usage of the motion information from the fifth non-adjacent block is based on at least one of: (a) an upper limit on a size of the AMVP candidate list, (b) dimensions of the current block of video data, and (c) an indication of usage of the motion information.

19. The method of claim 1, wherein the first mode is an AMVP mode and the second mode is a merge mode, or the first mode is the merge mode and the second mode is the AMVP mode; or the first mode is a bi-prediction mode and the second mode is a uni-prediction mode, or the first mode is the uni-prediction mode and the second mode is the bi-prediction mode; or the first mode is an affine mode, and the second mode is a non-affine mode, or the first mode is the non-affine mode, and the second mode is the affine mode; or the first mode is a first MV precision mode, and the second mode is a second MV precision mode.

* * * * *